United States Patent
Mukai et al.

(10) Patent No.: US 7,465,326 B2
(45) Date of Patent: Dec. 16, 2008

(54) HYDROGEN GENERATING APPARATUS

(75) Inventors: Yuji Mukai, Osaka (JP); Akira Maenishi, Osaka (JP); Yoshio Tamura, Nara (JP); Yutaka Yoshida, Mie (JP); Tomonori Asou, Nara (JP)

(73) Assignee: Panasonic Corporation, Osaka (JP)

( * ) Notice: Subject to any disclaimer, the term of this patent is extended or adjusted under 35 U.S.C. 154(b) by 71 days.

(21) Appl. No.: 10/581,967

(22) PCT Filed: Dec. 9, 2004

(86) PCT No.: PCT/JP2004/018411
§ 371 (c)(1), (2), (4) Date: Jun. 7, 2006

(87) PCT Pub. No.: WO2005/056468
PCT Pub. Date: Jun. 23, 2005

(65) Prior Publication Data
US 2007/0151152 A1  Jul. 5, 2007

(30) Foreign Application Priority Data
Dec. 9, 2003 (JP) .............................. 2003-410014
Mar. 26, 2004 (JP) .............................. 2004-091440

(51) Int. Cl.
*B01J 8/00* (2006.01)
(52) U.S. Cl. .................. 48/127.9; 422/191; 422/211
(58) Field of Classification Search ................ 48/127.9; 422/191, 211
See application file for complete search history.

(56) References Cited

U.S. PATENT DOCUMENTS 5,037,619 A    8/1991    Alagy et al.

6,481,207 B2 *  11/2002  Miura et al. .................. 60/670

(Continued)

FOREIGN PATENT DOCUMENTS

EP    0001946    5/1979

(Continued)

OTHER PUBLICATIONS

Machine Translation of JP 2003-252604.*

(Continued)

*Primary Examiner*—Walter D Griffin
*Assistant Examiner*—Natasha Young
(74) *Attorney, Agent, or Firm*—Dickinson Wright, PLLC

(57) ABSTRACT

[OBJECT] A hydrogen generator is provided which includes a lightweight, small-heat-capacity, high-performance gas mixer and is good in hydrogen generating efficiency and response.
[MEANS OF SOLVING] A hydrogen generator comprising: a mixed gas passage (9) configured to flow a mixed gas containing two or more components; first and second passages configured to branch off, at their leading ends, from the mixed gas passage and join to each other at their trailing ends; first turning means (45a) to (45d) formed in the first passage to turn the mixed gas flowing in the first passage in a first direction; second turning means (46a) to (46d) formed in the second passage to turn the mixed gas flowing in the second passage in a second direction opposite to the first direction; and a hydrogen generating section configured to generate hydrogen by causing a chemical reaction of the mixed gas which flows out from the joined trailing ends of the first and second passages.

13 Claims, 15 Drawing Sheets

U.S. PATENT DOCUMENTS

| | | | |
|---|---|---|---|
| 6,793,698 B1 * | 9/2004 | Sanger et al. | 48/127.9 |
| 2002/0042035 A1 * | 4/2002 | Komiya et al. | 431/268 |
| 2004/0144029 A1 * | 7/2004 | Miura et al. | 48/127.9 |

FOREIGN PATENT DOCUMENTS

| | | |
|---|---|---|
| JP | 5930128 | 7/1984 |
| JP | 49198 | 2/1992 |
| JP | 04180826 | 6/1992 |
| JP | 525538 | 4/1993 |
| JP | 07033402 | 2/1995 |
| JP | 2002087803 | 3/2002 |
| JP | 2003080047 | 3/2003 |
| JP | 2003176104 | 6/2003 |
| JP | 2003226504 | 8/2003 |
| JP | 2003252604 | 9/2003 |
| WO | 0063114 | 10/2000 |

OTHER PUBLICATIONS

PCT International Search Report dated Mar. 29, 2003.

* cited by examiner

HYDROGEN GENERATING APPARATUS

TECHNICAL FIELD

The present invention relates to a hydrogen generator which generates hydrogen through a chemical reaction between a material containing an organic compound composed of at least carbon and hydrogen and water and supplies the generated hydrogen to a fuel cell.

BACKGROUND ART

Fuel cell cogeneration systems (hereinafter referred to as "fuel cell systems") of high power generation efficiency and high combined efficiency have heretofore come to the fore as dispersion-type power generation systems capable of making efficient use of energy.

Fuel cell systems have a fuel cell as the main body of its power generating section. Most of fuel cells such as phosphoric-acid fuel cells (abbreviated to PAFC) which have already put in practical use and polymer electrolyte fuel cells (abbreviated to PEFC) which are under development use hydrogen as a fuel for power generation. Nevertheless, the means of supplying hydrogen are not provided as an infrastructure at present. Therefore, fuel cell systems are generally equipped with a hydrogen generator for generating hydrogen necessary for use in power generation In such a hydrogen generator, a hydrocarbon-based material such as methane gas and water are used to produce hydrogen-rich reformed gas. The fuel cell systems use the reformed gas generated by the hydrogen generator and air to generate and output a specified amount of electric power.

As a method of generating hydrogen with a hydrogen generator, steam reforming is widely known. In steam reforming, reformed gas is generated through a steam reforming reaction. This steam reforming reaction is one of various hydrogen generating reactions in which a chemical reaction is caused, for instance, between city gas (which is a material for generating hydrogen) and vapor, using a ruthenium catalyst at a high temperature of about 600° C. to 800° C., thereby generating a reformed gas that contains hydrogen as a main component.

One known hydrogen generator has a concentric multiple cylinder-like configuration.

FIG. 18 is a longitudinal sectional view that diagrammatically shows the internal configuration of one example of hydrogen generators capable of uniformly mixing a material with vapor. It should be noted that arrows in FIG. 18 indicate the flowing directions of gases such as the material and vapor.

As illustrated in FIG. 18, a hydrogen generator 300 capable of uniformly mixing the material with vapor has a concentric multiple cylinder-like configuration. More specifically, the hydrogen generator 300 includes a combustion burner 16 and heaters 17, 18. The combustion burner 16 generates a high-temperature combustion gas used for promoting the steam reforming reaction. The heaters 17, 18 are supplied with water and heated by the combustion burner 16 thereby generating wet steam or vapor. The hydrogen generator 300 also includes (a) a combustion gas passage 29 which is composed of a plurality of annular spaces defined by a plurality of concentric cylinders 19 to 28 arranged around the combustion burner 16 and in which a high-temperature fuel gas generated by the combustion burner 16 passes through the annular spaces; (b) a preheating layer 30 for preheating a mixed gas of the material and vapor before a steam reforming reaction; (c) a reforming catalyst layer 31 which is heated to a specified reaction temperature to promote the steam reforming reaction; (d) a heat recovery layer 32 for collecting heat in order to decrease the temperature of the high-temperature reformed gas generated by the reforming catalyst layer 31; (e) a shift catalyst layer 33 for reducing the concentration of carbon monoxide in the reformed gas cooled by the heat recovery layer 32; (f) first and second mixing layers 35, 36 for mixing the reformed gas reduced in the concentration of carbon monoxide by the shift catalyst layer 33 and air for use in a selective oxidation reaction taken from an air feeder section 34; and (g) first and second selective oxidation catalyst layers 37, 38 for further reducing the concentration of carbon monoxide in the reformed gas through a selective oxidation reaction, the reformed gas having passed through the first and second mixing layers 35, 36 so that it was mixed with air. These passage and layers are arranged in the form of concentric cylinders around the combustion burner 16. As illustrated in FIG. 18, in the hydrogen generator 300, the preheating layer 30, the heat recovery layer 32, the first mixed layer 35 and the second mixed layer 36 are each constructed by a packed body filled with ceramic balls for the purpose of promoting the mixing of the material with vapor or air (see, e.g., Patent Document 1).

In the hydrogen generator 300 of the above configuration, the water used for the steam reforming reaction is supplied to the heater 17 or 18, while at least part of it is vaporizing. On the other hand, the water (warm water) discharged from the heater 17 or 18 is mixed with city gas serving as the material in a mixing section (not shown in FIG. 18) and then completely vaporizes so as to be mixed with the city gas, while passing through the space between the concentric cylinders 25, 26 and the space between the concentric cylinders 24, 25. The mixed gas of the city gas and vapor is thoroughly mixed while passing through the preheating layer 30 and then supplied to the reforming catalyst layer 31. The reforming catalyst layer 31 is heated by a combustion gas flowing in the combustion gas passage 29 to be utilized for the proceeding steam reforming reaction. The reformed gas generated by the steam reforming reaction is cooled down to a specified temperature while passing through the heat recovery layer 32 and then supplied to the shift catalyst layer 33. Thereafter, most of the carbon monoxide contained in the reformed gas is removed by a shift reaction proceeding in the shift catalyst layer 33. Thereafter, the reformed gas from which most of the carbon monoxide has been removed is fully mixed, in the first mixing layer 35, with air supplied from the air feeder section 34 in order to remove most of the carbon monoxide remaining in a small amount in the reformed gas. Then, the reformed gas is supplied to the first selective oxidation catalyst layer 37. Most of the carbon monoxide contained in the reformed gas is removed by combustion through the selective oxidation reaction proceeding in the first selective oxidation catalyst layer 37. To remove carbon monoxide which could not be removed by the first selective oxidation catalyst layer 37, the reformed gas, the concentration of which has been uniformed by the second mixing layer 36, is supplied to the second selective oxidation catalyst layer 38 in which further carbon monoxide removal is done. The reformed gas from which carbon monoxide has been thoroughly removed is supplied to the fuel cell to be utilized for a chemical reaction for generating power in the fuel cell.

In the hydrogen generator 300 shown in FIG. 18, the preheating layer 30 composed of ceramic balls and located between concentric cylinders 20 and 21 disturbs the flow of the fluids passing through the preheating layer 30, so that the material such as city gas and vapor are vigorously mixed. That is, the flow of the material and vapor becomes three-dimensionally intricate under the influence of the ceramic balls while passing through the preheating layer 30, so that mixing of the material and vapor is favorably encouraged. In addition, in the hydrogen generator 300, when the reformed gas is supplied to the shift catalyst layer 33, the mixed condition of the reformed gas is improved by the mixing function of the heat recovery layer 32, so that the shift reaction in the shift catalyst layer 33 is favorably done. Further, in the hydrogen generator 300, when the reformed gas is respectively supplied to the first and second selective oxidation layers 37, 38, the mixed condition of the reformed gas is improved by the mixing function of the first and second mixing layers 35, 36, so that the selective oxidation reaction in the first and second selective oxidation catalyst layers 37, 38 favorably proceeds.

In the hydrogen generator 300, the preheating layer 30 filled with ceramic balls, the heat recovery layer 32, and the first and second mixing layers 35, 36 exhibit relatively good mixing performance to fluids existing in neighboring regions nevertheless they exhibit poor mixing performance to fluids existing in regions relatively far from each other. More concretely, since the material and vapor to be used for the reforming reaction are supplied from the upper right position of the hydrogen generator in FIG. 18, the concentration of the material and vapor contained in the fluid supplied to a portion of the preheating layer 30 located on the right side of FIG. 18 is higher than that of the material and vapor contained in the fluid supplied to a portion of the preheating layer 30 located on the left side of FIG. 18. In this case, it has proved practically difficult to uniformise the concentration of the material and vapor contained in the fluid in a circumferential direction of the preheating layer 30 for the reason that the fluid has to be moved within the preheating layer 30 along the circumference thereof which is much longer than the vertical length of the preheating layer 30. Therefore, the concentration of the material and vapor supplied to the reforming catalyst layer 31 is unevenly distributed in the circumferential direction of the catalyst layer 31. Moreover, the reforming catalyst layer 31 is excessively heated in the area where the concentration of the material and vapor is low, which leads to deterioration of the reforming catalyst. Additionally, in the area of the reforming catalyst layer 31 where the concentration of the material and vapor is high, the temperature of the reforming catalyst layer 31 does not sufficiently rise and therefore the inversion rate for hydrogen generation decreases, owing to the presence of an excessive amount of vapor.

Similarly to the case of the preheating layer 30 described above, uniform distribution of air in a circumferential direction of the first mixing layer 35 is difficult because of the difference between the concentrations of air supplied from Positions P1, P2 in FIG. 18. Therefore, the concentration of oxygen supplied to the first selective oxidation catalyst layer 37 is distributed unevenly in the circumferential direction of the catalyst layer 37. This causes insufficient removal of carbon monoxide from the reformed gas in the area of the first selective oxidation catalyst layer 37 where the concentration of oxygen is low. On the other hand, in the area of the first selective oxidation catalyst layer 37 where the concentration of oxygen is high, surplus oxygen still remaining after oxidative removal of carbon monoxide from the reformed gas consumes generated hydrogen, resulting in poor hydrogen generating efficiency.

To prevent the concentration of the material and vapor supplied to the reforming catalyst layer 31 from varying to a considerable extent, there has been proposed a hydrogen generator having improved mixing performance to fluids that exist in positions distant from each other in a circumferential direction.

FIG. 19 is a longitudinal sectional view that diagrammatically shows the internal configuration of one example of hydrogen generators having improved mixing performance to fluids that exist in positions distant from each other in a circumferential direction. It should be noted that arrows in FIG. 19 indicate the flowing directions of gases such as the material and vapor.

As shown in FIG. 19, a hydrogen generator 400 includes a city gas feed pipe connection part 1, a water feed pipe connection part 2, a combustion gas exhaust port 13, and an outlet pipe 15. The hydrogen generator 400 also has (a) combustion gas passages 4 to 6, (b) a downward flow passage 8 through which city gas supplied from the city gas feed pipe connection part 1 and water supplied from the water feed pipe connection part 2 flow downward, (c) an upward flow passage 9 through which the mixed gas of the city gas and vapor flows upward, the mixed gas having been generated in the cause of the downward flow in the flow down passage 8, and (d) a reformed gas passage 11 which allows circulation of a reformed gas within the hydrogen generator 400, the reformed gas having been generated through a steam reforming reaction. These passages are arranged in the form of concentric cylinders around the combustion burner 3. In the hydrogen generator 400, an evaporator 10 is constituted by the downward flow passage 8 and the upward flow passage 9, and the reformed gas passage 11 has, at a specified inner position thereof, a reforming catalyst layer 12 which is used for promoting the steam reforming reaction. In the hydrogen generator 400 shown in FIG. 19, the upward flow passage 9 and the reformed gas passage 11 are connected to each other by a disk-like space 41 defined by two disk-like lateral walls 39, 40 and a catalyst pipe 42. As illustrated in FIG. 19, in the hydrogen generator 400, at least the disk-like space 41 is filled with a large number of spherical alumina particles 43 for encouraging mixing of the material and vapor. The alumina particles 43 have a diameter about one third the height of the space 41.

In the hydrogen generator 400 having the above-described configuration, a mixed gas of city gas and vapor is generated in the evaporator 10, when city gas and water are fed from the city gas feed pipe connection part 1 and the water feed pipe connection part 2, respectively, to the downward flow passage 8. The mixed gas of city gas and vapor, which exist within the evaporator 10 so as to spread in a circumferential direction thereof, then passes through the space 41 and the catalyst pipe 42 to be fed to the reforming catalyst layer 12 filled with a reforming catalyst. Then, in the reforming catalyst layer 12, the reforming catalyst is heated up to a high temperature by a combustion gas flowing in the combustion gas passage 4 to promote the steam reforming reaction, so that a reformed gas containing hydrogen, carbon dioxide and carbon monoxide is generated from the mixed gas. Similarly to the hydrogen generator 300 shown in FIG. 18, at least the space 41 is filled with the alumina particles 43 in the hydrogen generator 400 and therefore, the flow of the fluid in the disk-like space 41 is disturbed so that the material such as city gas is vigorously mixed with vapor. That is, the flow of the mixed gas composed of the material and vapor becomes three-dimensionally intricate under the influence of the alumina particles 43 while the mixed gas is passing through the disk-like space 41 and as a result, the mixed condition of the material and vapor is improved like the case of the hydrogen generator 300 shown in FIG. 18.

Additionally, in the hydrogen generator 400, since the upward flow passage 9 and the reformed gas passage 11 are connected to each other by the disk-like space 41 defined by the two disk-like lateral walls 39, 40 and the catalyst pipe 42, the mixed gas of city gas and vapor, which have passed through the evaporator 10, goes to the disk-like space 41 from the entire circumferential area of the evaporator 10. After the mixed gas passes through the space 41 while being brought into a turbulent condition under the influence of the alumina particles 43 and is collected by the catalyst pipe 42, it is supplied to the reforming catalyst layer 12. Therefore, the city gas fed from the city gas feed pipe connection part 1 flows in the downward flow passage 8 and the upward flow passage 9, more heavily on the side of the city gas feed pipe connection part 1, so that the concentration of city gas in the mixed gas is higher in the right portion of the space 41 shown in FIG. 19 and the concentration of the same is lower in the left portion of the space 41 shown in FIG. 19. More specifically, even if a spatial concentration distribution occurs in a circumferential direction, the mixed condition of, for instance, the city gas and vapor in the circumferential direction of the reforming catalyst layer 12 is satisfactorily averaged. That is, according to the hydrogen generator 400 shown in FIG. 19, not only the mixed condition of a fluid such as a mixed gas of city gas and vapor but also the mixed condition of fluids existing in positions distant from each other in a circumferential direction can be improved.

Patent Document 1: International Publication No. WO2000/063114

DISCLOSURE OF THE INVENTION

Problems that the Invention is to Solve

The hydrogen generator 400 described earlier has revealed the problem that since at least the space 41 is filled with a large number of alumina particles 43 for improving the mixed condition of the city gas and vapor in the mixed gas, the hydrogen generator 400 increases in weight. This is an obstacle to development of lightweight fuel cell systems equipped with the hydrogen generator 400.

Owing to a large number of alumina particles 43 used in the hydrogen generator 400, the heat capacity of the hydrogen generator 400 increases. For this reason, if the amount of reformed gas to be supplied to the fuel cell has to be increased in compliance with an increase in electric power consumed by the load, it takes time to make the temperature distribution within the hydrogen generator 400 optimum and therefore the hydrogen generator 400 is poor in response. This disadvantage is a serious problem particularly when starting up the hydrogen generator 400.

More concretely, the temperature of the alumina particles 43 is equal or close to room temperature upon start-up of the hydrogen generator 400 and then, gradually increases as the hydrogen generator 400 is heated by high-temperature combustion gas generated by the combustion burner 3. In this case, the amount of heat required for increasing the temperature of all the alumina particles 43 from, for instance, room temperature to 200° C. is about 140 kJ on the assumption that the total amount of the alumina particles 43 is about 1 kg and their specific heat is about 0.8 kJ/kg·° C. And, about 3.3 NLM of city gas is necessary for generating about 140 kJ to heat the alumina particles 43 by combusting city gas just after starting up the hydrogen generator 400 which uses city gas as a material, provided that the lower calorific value of city gas is about 42 kJ/NLM. In this case, it takes about two minutes to raise the temperature of all the alumina particles 43 from room temperature to 200° C., provided that heating of the alumina particles 43 is done through combustion of city gas at a rate of about 1.5 NLM/min. In reality, thermal loss due to heat liberation occurs in the hydrogen generator 400, which causes a delay of two-minutes or more in starting up.

If the material and vapor are supplied to the hydrogen generator 400 before the temperature of the alumina particles 43 sufficiently increases, the supplied vapor is cooled by the alumina particles 43 and condensed into water, so that the reforming catalyst layer 12 will be supplied with the material lacking vapor. In this case, if the steam reforming reaction is allowed to progress under a vapor-lacking condition (more concretely, the condition where the S/C ratio, which is the ratio of the molar quantity S of vapor supplied to the reforming catalyst layer 12 to the molar quantity C of carbon contained in the material, is lower than the range of 2.7 to 3.2), carbon contained in the material precipitates on the surface of the reforming catalyst, lowering the catalytic property of the reforming catalyst. If such an operating condition continues, the catalytic performance of the overall reforming catalyst layer gradually degrades and, in consequence, long use of the hydrogen generator 400 becomes impossible. Practically, to avoid this, the material and vapor have to be supplied to the hydrogen generator 400 after the temperature of the alumina particles 43 has sufficiently increased. In short, the above-described hydrogen generator 400 presents the problem that the wait time after start-up until outputting of electric power starts is too long.

In the hydrogen generator 300 shown in FIG. 18, the pre-heating layer 30 or the first mixing layer 35 etc. is constituted by ceramic balls. Therefore, the hydrogen generator 300 suffers from the same problem as of the hydrogen generator 400.

The present invention is directed to overcoming the foregoing problems and a primary object of the invention is therefore to provide a hydrogen generator which is equipped with a lightweight, low-heat-capacity, high-performance gas mixer and is good in hydrogen generating efficiency as well as in response.

Means of Solving the Problems

In accomplishing the above object, there has been provided, in accordance with the invention, a hydrogen generator comprising: a mixed gas passage configured to flow a mixed gas containing two or more components; first and second passages configured to branch off, at their leading ends, from the mixed gas passage and join to each other at their trailing ends; first turning means formed in the first passage to turn the mixed gas flowing in the first passage in a first direction; second turning means formed in the second passage to turn the mixed gas flowing in the second passage in a second direction opposite to the first direction; and a hydrogen generating section configured to generate hydrogen by causing a chemical reaction of the mixed gas which flows out from the joined trailing ends of the first and second passages.

In this configuration, not only the mixed condition of the mixed gas to be supplied to a reforming catalyst layer or a selective oxidation catalyst layer can be improved, but also the concentration of a component (such as city gas) of the mixed gas to be supplied to the reforming catalyst layer or the selective oxidation catalyst layer can be uniformed irrespective of its feeding position. Therefore, a hydrogen generator good in hydrogen generating efficiency can be achieved.

In this case, the first and second passages are formed so as to allow the mixed gas to turn in the first and second directions respectively, when flowing in planes perpendicular to the outflow direction of the mixed gas flowing out from the trailing ends of the first and second passages.

This configuration enables formation of a plate-like gas mixer and therefore a thin-shaped hydrogen generator.

In this case, the first and second passages have a common central axis and are hollow in shape, each having an open outer periphery and a circular opening at the center thereof. The outer periphery of each passage constitutes an inlet that serves as the leading end while the opening of each passage constitutes an outlet that serves as the trailing end. The first turning means is composed of a plurality of partition walls that partition the inner space of the first passage in a direction along the central axis. Each partition wall extends inwardly from the outer periphery of the inner space such that its trailing end is deviated from its leading end in the first direction with respect to a radial direction. The second turning means is composed of a plurality of partition walls that partition the inner space of the second passage in a direction along the central axis. Each partition wall extends inwardly from the outer periphery of the inner space such that its trailing end is deviated from its leading end in the second direction with respect to a radial direction.

With this configuration, a desirable plate-like gas mixer of good gas mixing performance can be formed.

In this case, the angle of deviation of the trailing end from the leading end around the central axis in each partition wall is within the range of 45 to 90 degrees.

This leads to a desirable improvement in the mixed condition of the mixed gas.

In this case, a plurality of aforesaid first and second passages and a plurality of aforesaid first and second turning means are arranged along the central axis.

This leads to a further desirable improvement in the mixed condition of the mixed gas.

In the above case, the first and second passages are formed so as to allow the mixed gas to turn in the first and second directions respectively, when flowing in cylindrical planes parallel to the outflow direction of the mixed gas flowing from the trailing ends of the first and second passages.

With this configuration, a cylindrical gas mixer can be formed, which enables a small-sized hydrogen generator.

In this case, the first and second passages have a common central axis and are respectively formed in the shape of a tube of annular section, and one end face of each passage constituting an inlet that serves as the leading end while the other end face of each passage constitutes an outlet that serves as the trailing end. The first turning means is composed of a plurality of partition walls which turn in the first direction, helically partitioning the tubular inner space of the first passage, whereas the second turning means is composed of a plurality of partition walls which turn in the second direction, helically partitioning the tubular inner space of the second passage.

With this configuration, a desirable tubular gas mixer of good gas mixing performance can be formed.

In this case, the turning angle of each of the partition walls from its leading end to its trailing end is within the range of 45 to 90 degrees.

This brings about a desirable improvement in the mixed condition of the mixed gas.

In this case, the outlets of turning passages separated by the partition walls are partially closed.

This leads to a further desirable improvement in the mixed condition of the mixed gas.

In this case, the first passage and the second passage are separated from each other by a cylindrical dividing wall, the outlets of the turning passages of either the first or second passage are closed, and an opening is formed in the dividing wall at a position in the vicinity of each of the closed outlets.

This leads to a further desirable improvement in the mixed condition of the mixed gas.

In this case, a plurality of aforesaid first passages are arranged along the central axis such that the trailing end of a first passage located in an upstream position when viewed in the flowing direction of the mixed gas is connected to the leading end of a first passage located in a downstream position and a plurality of aforesaid second passages are arranged along the central axis such that the trailing end of a second passage located in an upstream position when viewed in the flowing direction of the mixed gas is connected to the leading end of a second passage located in a downstream position.

This leads to a further desirable improvement in the mixed condition of the mixed gas.

In the above case, the mixed gas is a mixture of water and an organic compound containing at least carbon and hydrogen; the chemical reaction is a steam reforming reaction in which hydrogen is generated from the mixed gas of the organic compound and water; the hydrogen generating section is a reforming reactor section for generating a hydrogen-rich reformed gas through the steam reforming reaction. The first and second turning means are located at positions upstream of the reforming reactor section. The mixed gas flowing out from the joined trailing ends of the first and second passages is supplied to the reforming reactor section to generate hydrogen.

With this configuration, the mixed condition of the mixed gas supplied to the reforming reactor section is improved so that the reforming reaction can properly proceed in the reforming reactor section.

In the above case, the mixed gas is a mixture of the reformed gas and oxygen, and a selective oxidation reactor section is used in place of the hydrogen generating section, the selective oxidation reactor section reducing carbon monoxide contained in the reformed gas through a selective oxidation reaction in which carbon monoxide is converted into carbon dioxide. The first turning means and second turning means are located at positions upstream of the selective oxidation reactor section. The mixed gas flowing out from the joined trailing ends of the first and second passages is supplied to the selective oxidation reactor section to reduce carbon monoxide contained in the reformed gas.

With this configuration, the mixed condition of the mixed gas supplied to the selective oxidation reactor section is improved so that the selective oxidation reaction can properly proceed in the selective oxidation reactor section.

The Effect of the Invention

The invention makes it possible to provide a hydrogen generator having high hydrogen generating efficiency and good response which is carried out similarly to the solving means described earlier and includes a lightweight, small-heat-capacity, high-performance gas mixer.

According to the invention, it is possible to avoid time and spatial non-uniformities in the concentrations of fluids such as the mixed gas of a material and vapor supplied to the reforming catalyst layer. As a result, time and spatial uniformities can be ensured for the concentration of the reformed gas so that the reforming catalyst layer and the carbon monoxide removing catalyst layer such as a shift reactor vessel disposed at a position downstream of the reforming catalyst layer can be effectively used. This largely contributes to reductions in the amount of catalysts used and to miniaturization of hydrogen generators.

Figure 1:
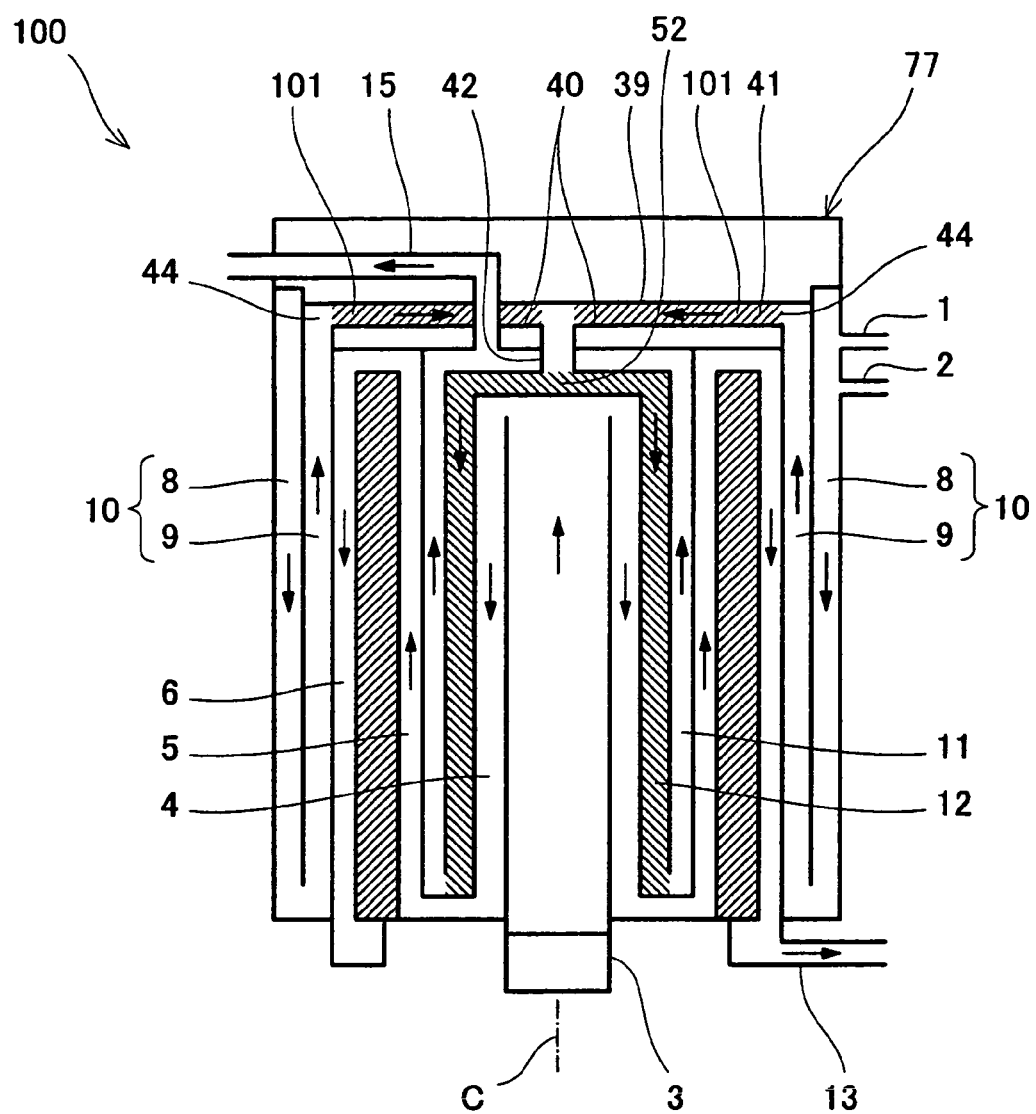
FIG. 1 is a longitudinal sectional view diagrammatically showing an internal configuration of a hydrogen generator according to a first embodiment of the invention.

| Explanation of Reference Numerals | |
|---|---|
| 1: | city gas feed pipe connection part |
| 2: | water feed pipe connection part |
| 3: | combustion burner |
| 4-6: | combustion gas passage |
| 8: | downward flow passage |
| 9: | upward flow passage |
| 10: | evaporator |
| 11: | reformed gas passage |
| 12: | reforming catalyst layer |
| 13: | combustion gas exhaust port |
| 15: | outlet pipe |
| 16: | combustion burner |
| 17, 18: | heater |
| 19-28: | concentric cylinder |
| 29: | combustion gas passage |
| 30: | preheating layer |
| 31: | reforming catalyst layer |
| 32: | heat recovery layer |
| 33: | shift reaction layer |
| 34: | air feed section |
| 35: | first mixing layer |
| 36: | second mixing layer |
| 37: | first selective oxidation catalyst layer |
| 38: | second selective oxidation catalyst layer |
| 39-40: | lateral wall |
| 41: | space |
| 42: | catalyst pipe |
| 43: | alumina particles |
| 44: | end |
| 45a-45d: | passage forming member |
| 46a-46d: | passage forming member |
| 47-49: | mixed gas |
| 50: | dividing wall |
| 51: | communication hole |
| 52: | end |
| 53a-53d: | passage forming member |
| 54a-54d: | passage forming member |
| 55, 56: | mixed gas |
| 57: | partition plate |
| 58: | dividing wall |
| 59a-59h: | passage forming member |
| 60a-60h: | passage forming member |
| 61: | mixing concentric cylinder |
| 62a-62d: | inner passage forming member |
| 63a-63d: | outer passage forming member |
| 64-66: | reformed gas |
| 67a-67h: | inner passage forming member |
| 68a-68h: | outer passage forming member |
| 69, 70: | outlet |
| 71: | baffle plate |
| 72, 73: | openings |
| 74: | baffle plate |
| 75: | openings |
| 76: | mixing concentric cylinder |
| 77: | housing |
| 101: | gas mixer |
| 101': | gas mixer |
| 102, 103: | gas mixer |

-continued

Explanation of Reference Numerals

| | |
|---|---|
| 201, 202: | gas mixer |
| 203-208: | gas mixer |
| 100-400: | hydrogen generator |
| A: | first specified position |
| B: | second specified position |
| C: | third specified position |
| D: | fourth specified position |
| E: | fifth specified position |
| F: | sixth specified position |
| G: | seventh specified position |
| H: | eighth specified position |
| c: | central axis |

BEST MODE FOR CARRYING OUT THE INVENTION

Referring now to the accompanying drawings, the best mode for carrying out the invention will be hereinafter described in detail.

First Embodiment

The first embodiment of the invention is associated with a technique according to which an evaporator for evaporating supplied water to be mixed with material, thereby generating a mixed gas is connected to a reactor section for promoting a steam reforming reaction to generate a reformed gas, by means of a disk-like space in which a gas mixer is disposed, whereby the mixed condition of the mixed gas with respect to a horizontal direction is improved.

First, reference is made to FIG. 1 to describe the fundamental configuration and operation of a hydrogen generator 100 according to the first embodiment.

FIG. 1 is a longitudinal sectional view diagrammatically showing the internal configuration of the hydrogen generator 100 of the first embodiment of the invention. It should be noted that a shift reactor or selective oxidation reactor for removing carbon monoxide from the reformed gas and a fuel cell body are omitted from FIG. 1 for simplicity. It should also be noted that arrows shown in FIG. 1 indicate the flowing directions of gases such as a material and vapor.

As shown in FIG. 1, the hydrogen generator 100 of the first embodiment has a cylindrical housing 77 closed at its upper and lower ends. The inner part of the housing 77 is partitioned by cylindrical vertical walls and disk-like lateral walls so as to form the following various passages etc. The hydrogen generator 100 having the housing 77 includes a city gas feed pipe connection part 1 for feeding city gas from an outside infrastructure to the hydrogen generator 100; a water feed pipe connection part 2 for feeding water from a water line to the hydrogen generator 100; and a combustion burner 3 for generating high-temperature combustion gas used for promoting a steam reforming reaction.

The hydrogen generator 100 has combustion gas passages 4 to 6 for allowing the high-temperature combustion gas generated by the combustion burner 3 to circulate within the hydrogen generator 100; a downward flow passage 8 through which the city gas supplied from the city gas feed pipe connection part 1 and water supplied from the water feed pipe connection part 2 flow downward; an upward flow passage 9 through which a mixed gas of vapor and city gas flows upward, the mixed gas having been generated in the course of the downward flow through the downward flow passage 8; and a reformed gas passage 11 for allowing a reformed gas generated by the steam reforming reaction to circulate within the hydrogen generator 100. These passages are arranged in the form of concentric cylinders in relation to the central axis C of the hydrogen generator 100. In the hydrogen generator 100 of the first embodiment, the downward flow passage 8 and the upward flow passage 9 constitute an evaporator 10 which generates vapor and mixes the vapor with the city gas. Formed in a specified region inside the reformed gas passage 11 is a reforming catalyst layer 12 for promoting the steam reforming reaction. The hydrogen generator 100 also includes a combustion gas exhaust port 13 for letting the combustion gas which has passed through the combustion gas passages 4 to 6 out of the hydrogen generator 100 and an outlet pipe 15 for discharging the reformed gas which has passed through the reformed gas passage 11 outwardly from the hydrogen generator 100.

As illustrated in FIG. 1, the hydrogen generator 100 of the first embodiment is configured such that an end 44 of the upward flow passage 9 is connected to a catalyst pipe 42 for introducing the mixed gas into the reformed gas passage 11 through a disk-like space 41 located between and defined by two disk-like lateral walls 39, 40. Herein, the lateral wall 40 has, at its center, a through hole which has such a diameter that the catalyst pipe 42 can be fitted in the through hole. One end of the catalyst pipe 42 is connected to the through hole. In addition, the hydrogen generator 100 is provided with a gas mixer 101 that is positioned in the above-described disk-like space 41, as illustrated in FIG. 1. This gas mixer 101 featuring the invention is provided in order to improve the mixed condition of the mixed gas of the material and vapor which have passed through the upward flow passage 9. The configuration of the gas mixer 101 will be later described in detail.

In the hydrogen generator 100 thus constructed according to the first embodiment, after the material (e.g., city gas) and water are supplied to the downward flow passage 8 from the city gas feed pipe connection part 1 and the water feed pipe connection part 2 respectively, the water is heated, generating vapor in the downward flow passage 8 and thereafter, the vapor and the material are gradually mixed while passing through the upward flow passage 9 and then discharged in the form of a mixed gas from the end 44 of the upward flow passage 9. That is, a mixed gas is generated from the material and vapor in the evaporator 10. The mixed gas generated in the evaporator 10 is then supplied to the space 41 where the gas mixer 101 is placed. In this gas mixer 101, the material and vapor contained in the mixed gas are thoroughly mixed while the mixed gas, which has dispersed within the upward flow passage 9 with concentration distribution in a circumferential direction thereof, is collected and uniformly mixed. The function of the gas mixer 101 for improving the mixed condition of the mixed gas will be later described in detail.

The mixed gas, which has passed through the gas mixer 101, goes through the catalyst pipe 42 and is then supplied to the reformed gas passage 11 having the reforming catalyst layer 12 filled with a reforming catalyst. The reforming catalyst layer 12 is then heated to high temperature by the combustion gas flowing in the combustion gas passage 4 so that the steam reforming reaction proceeds in the reforming catalyst layer 12, thereby generating a reformed gas from the mixed gas, the reformed gas containing hydrogen, carbon dioxide and carbon monoxide. Thereafter, the reformed gas goes through the reformed gas passage 11 and is then supplied from the outlet pipe 15 to a shift reactor for reducing the concentration of carbon monoxide in the reformed gas. After passing through the combustion gas passage 4, the combustion gas goes through the combustion gas passages 5, 6 and through the combustion gas exhaust port 13 to be discharged outwardly from the hydrogen generator 100.

Next, the configuration of the gas mixer 101 of the first embodiment of the invention will be described below with reference to the drawings.

Figure 2A:
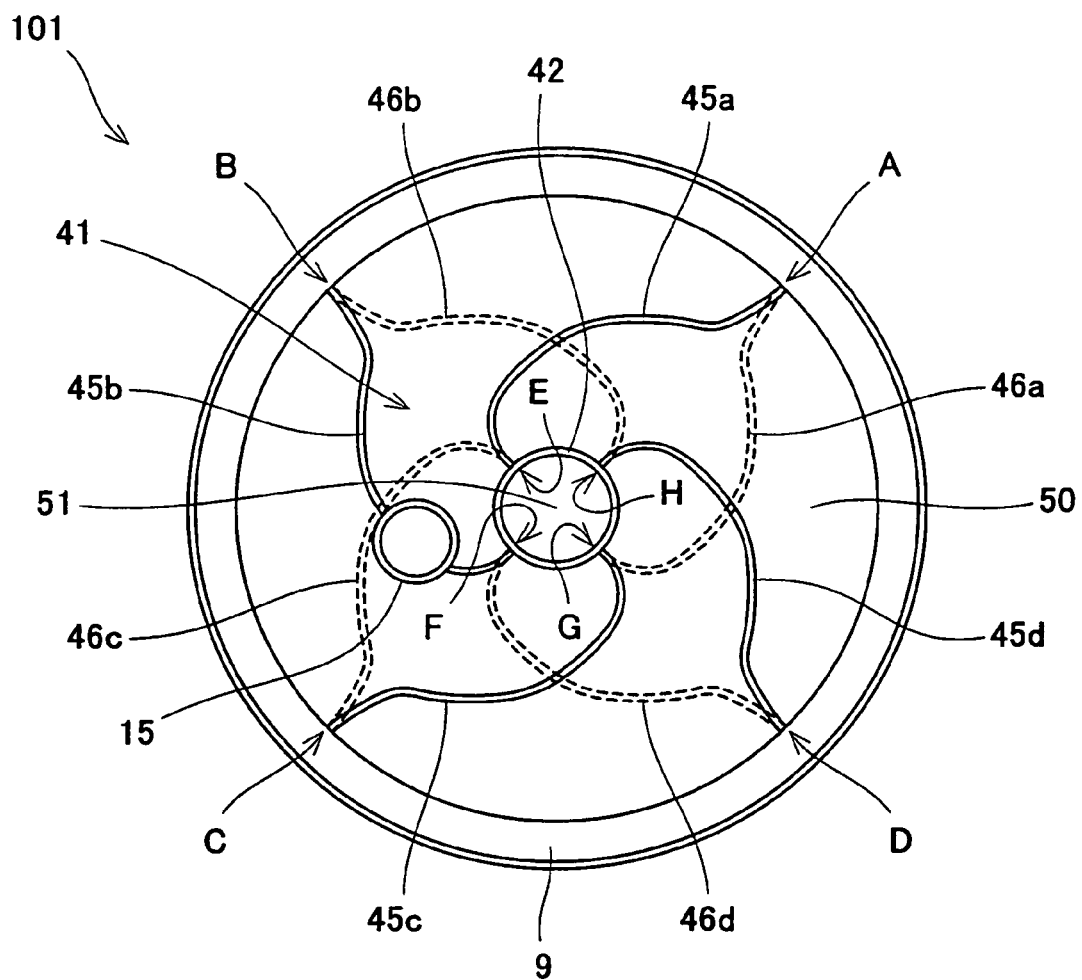
FIG. 2 is structural diagrams each diagrammatically showing an internal configuration of a gas mixer according to the first embodiment of the invention, wherein FIGS. 2(*a*) and 2(*b*) are a plan view and sectional view, respectively, of the gas mixer.
Figure 2B:
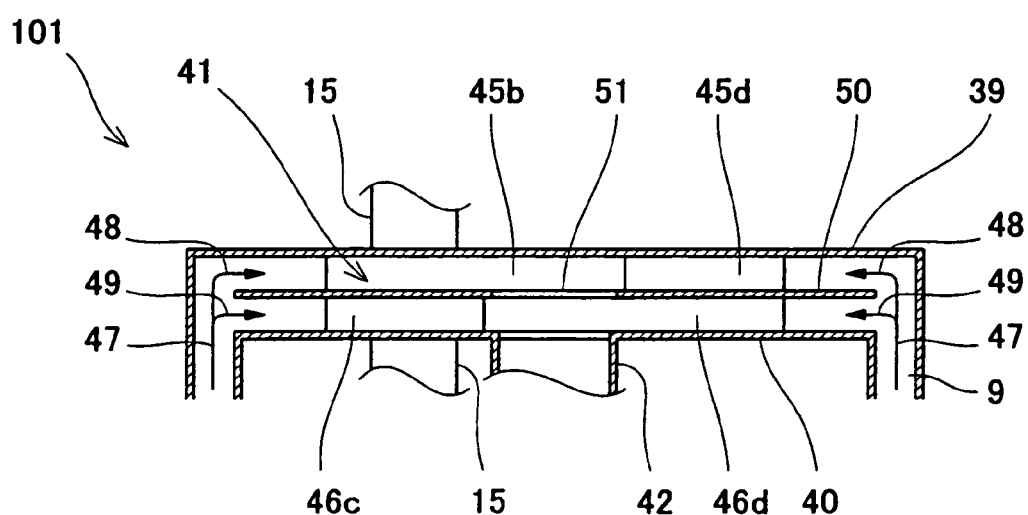

FIG. 2 is structural diagrams each diagrammatically showing the internal configuration of the gas mixer 101 according to the first embodiment of the invention, wherein FIGS. 2(a) and 2(b) are a plan view and sectional view, respectively, of the gas mixer 101. In FIG. 2(a), upper passage forming members 45a to 45d (described later) in the gas mixer 101 are indicated by solid line and lower passage forming members 46a to 46d (described later) by broken line.

As illustrated in FIGS. 2(a) and 2(b), the gas mixer 101 of the first embodiment has a disk-like dividing wall 50 for dividing the flow of mixed gas 47 coming up from the upward flow passage 9 shown in FIG. 1 into two streams, i.e., the streams of mixed gas 48, 49. At the center of the dividing wall 50, a communication hole 51 is provided which has substantially the same diameter as that of the catalyst pipe 42. Passage forming members 45a to 45d and 46a to 46d are located on the faces of the dividing wall 50 respectively, each member extending between the outer circumference of the communication hole 51 and the outer circumference of the dividing wall 50. Each passage forming member has a volute-like shape in a plan view and a strip-like shape in a side view.

More concretely, as illustrated in FIG. 2(a), four passage forming members 45a to 45d each having a specified volute-like shape are formed at regular intervals on the upper side of the dividing wall 50. These passage forming members 45a to 45d are convoluted such that the flow of mixed gas 48 turns counterclockwise. As illustrated in FIG. 2(a), four passage forming members 46a to 46d each having a specified volute-like shape are formed at regular intervals at the underside of the dividing wall 50. These passage forming members 46a to 46d are convoluted such that the flow of mixed gas 49 turns clockwise. The passage forming members 45a to 45d are provided on the surface of the dividing wall 50 such that, as illustrated in FIG. 2(a), their first longitudinal ends (on the side of the outer circumference of the dividing wall 50) are located at first to fourth specified positions A-D respectively, the positions A-D being equally spaced at 90 degrees apart. Their second longitudinal ends (on the side of the inner circumference of the dividing wall 50 (i.e., on the side of the outer circumference of the communication hole 51)) are located at fifth to eighth positions E-H respectively, the positions E-H being 90 degrees apart from the first to fourth specified positions A-D respectively in a counterclockwise direction. On the other hand, the passage forming members 46a to 46d are provided on the surface of the dividing wall 50 such that, as illustrated in FIG. 2(a), their first longitudinal ends (on the side of the outer circumference of the dividing wall 50) are located at the first to fourth specified positions A-D respectively. Their second longitudinal ends (on the side of the inner circumference of the dividing wall 50 (i.e., on the side of the outer circumference of the communication hole 51)) are located at the seventh specified position G, sixth specified position F, fifth specified position E and eighth specified position H, respectively, these positions G, F, E, H being 90 degrees apart from the first to fourth positions A-D respectively in a clockwise direction. Specifically, in the gas mixer 101 of this embodiment, the passage forming members 45a to 45d and the passage forming members 46a to 46d are respectively convolutedly formed so as to turn the flows of the mixed gas 48, 49 in opposite directions in the plan view of FIG. 2(a) and turn these flows 48, 49 in the same direction when viewing from each face of the dividing wall 50. The gas mixer 101 constituted by the dividing wall 50, the passage forming members 45a to 45d and the passage forming members 46a to 46d is fixedly fitted in the disk-like space 41 that connects the upward flow passage 9 to the catalyst pipe 42, by a specified fixing means such that the communication hole 51 of the gas mixer 101 is brought into substantial alignment with a catalyst pipe 42 in the direction of the central axis C. As illustrated in FIGS. 2(a) and 2(b), the outlet pipe 15 for releasing the reformed gas generated in the reforming catalyst layer 12 outwardly from the hydrogen generator 100 runs through the gas mixer 101 at its specified position. It is preferable that the passage forming members 45a to 45d and the passage forming members 46a to 46d have the same configuration in order that the mixed gas flows in the passages defined by these members at the same flow rate.

The function of the gas mixer 101 of the first embodiment for improving the mixed condition of the mixed gas will be described in detail with reference to the drawings.

Figure 3:
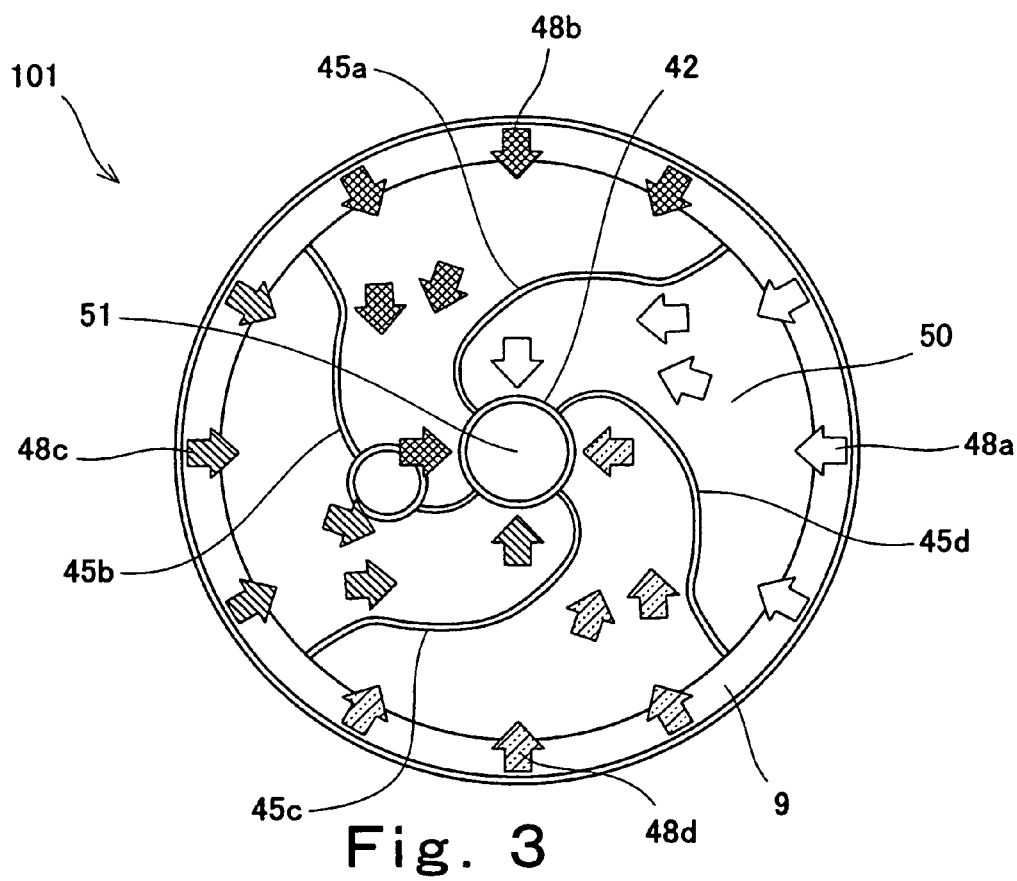
FIG. 3 is an explanatory view diagrammatically showing mixed gas streams on a dividing wall, the mixed gas streams being created by dividing a flow of mixed gas by the dividing wall.

FIG. 3 is an explanatory view diagrammatically showing the streams of mixed gas 48 on the dividing wall 50, the mixed gas streams 48 being created by dividing the flow of mixed gas 47 by the dividing wall 50. FIG. 3 is a plan view of the gas mixer 101 when viewed in the same direction as of the plan view of FIG. 2(a). In FIG. 3, the streams of mixed gas 48, which are coming in four directions onto the top face of the dividing wall 50, are indicated by differently hatched arrows for descriptive purposes.

Figure 4:
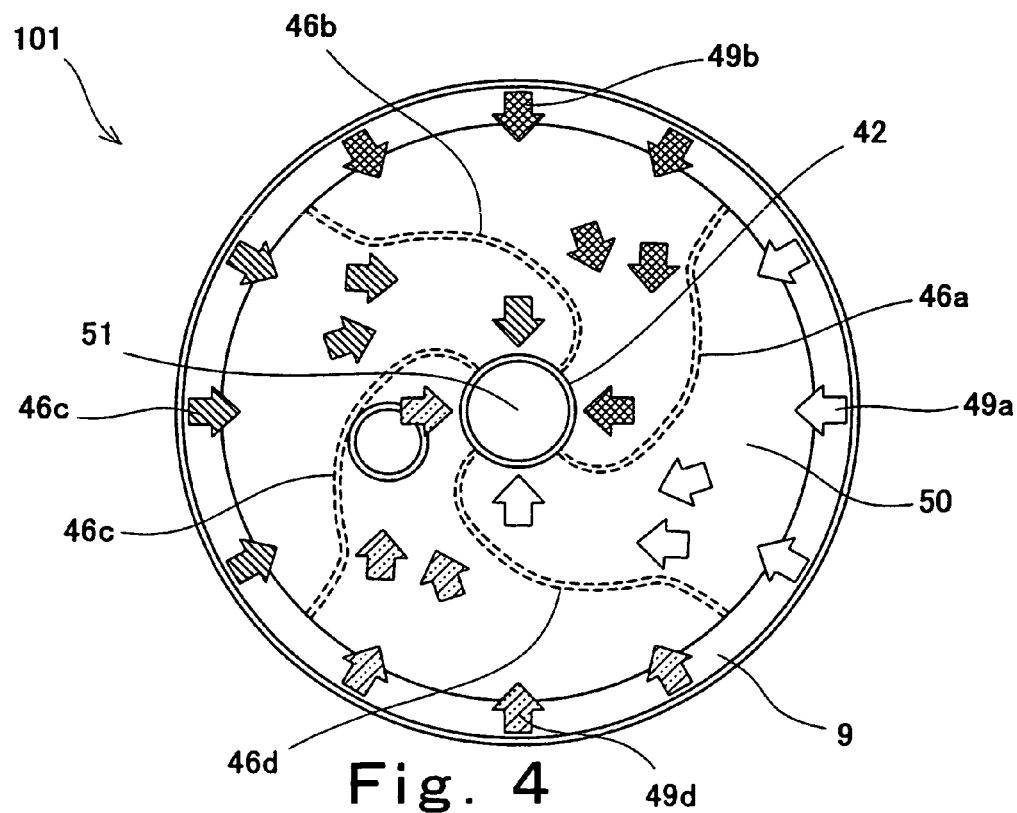
FIG. 4 is an explanatory view diagrammatically showing mixed gas streams under the dividing wall, the mixed gas streams being created by dividing the flow of mixed gas by the dividing wall.

FIG. 4 is an explanatory view diagrammatically showing the streams of mixed gas 49 under the dividing wall 50, the mixed gas streams 49 being created by dividing the flow of mixed gas 47 by the dividing wall 50. FIG. 4 is a partially perspective plan view of the gas mixer 101 when viewed in the same direction as of the plan view of FIG. 2(a). In FIG. 4, the streams of mixed gas 49, which are coming in four directions to the underside of the dividing wall 50, are indicated by differently hatched arrows for descriptive purposes.

As shown in FIG. 3, a stream of mixed gas 48a indicated by white arrow for instance, which has been coming from the right side of FIG. 3, is turned counterclockwise by the passage forming members 45a and 45d so that it goes into the communication hole 51 from the upper side of the hole 51 in FIG. 3. A stream of mixed gas 48b indicated by another type of arrow, which has been coming from the upper side of FIG. 3, is turned counterclockwise by the passage forming members 45b and 45a so that it goes into the communication hole 51 from the left side of the hole 51 in FIG. 3. A stream of mixed gas 48c indicated by another type of arrow, which has been coming from the left side of FIG. 3, is turned counterclockwise by the passage forming members 45c and 45b so that it goes into the communication hole 51 from the lower side of the hole 51 in FIG. 3. A stream of mixed gas 48d indicated by another type of arrow, which has been coming from the lower side of FIG. 3, is turned counterclockwise by the passage forming members 45d and 45c so that it goes into the communication hole 51 from the right side of the hole 51 in FIG. 3. In this way, the passage forming members 45a to 45d have the function of turning the streams of mixed gas 48a to 48d, respectively, through 90 degrees in a counterclockwise direction to send into the communication hole 51, the streams of mixed gas 48a to 48d having come to the upper face of the dividing wall 50.

On the other hand, as shown in FIG. 4, a stream of mixed gas 49a indicated by white arrow, which has been coming from the right side of FIG. 4, is turned clockwise by the passage forming members 46a and 46d so that it goes into the communication hole 51 from the lower side of the hole 51 in FIG. 4. A stream of mixed gas 49b indicated by another type of arrow, which has been coming from the upper side of FIG. 4, is turned clockwise by the passage forming members 46b and 46a so that it goes into the communication hole 51 from the right side of the hole 51 in FIG. 4. A stream of mixed gas 49c indicated by another type of arrow, which has been coming from the left side of FIG. 4, is turned clockwise by the passage forming members 46c and 46b so that it goes into the communication hole 51 from the upper side thereof in FIG. 4. A stream of mixed gas 49d indicated by another type of arrow, which has been coming from the lower side of FIG. 4, is turned clockwise by the passage forming members 46d and 46c so that it goes into the communication hole 51 from the left side thereof in FIG. 4. In this way, the passage forming members 46a to 46d have the function of turning the streams of mixed gas 49a to 49d, respectively, through 90 degrees in a clockwise direction to send to the communication hole 51, the streams of mixed gas 49a to 49d having come to the underside of the dividing wall 50.

As a result, in the gas mixer 101 of this embodiment, the mixed gas 48a that is half in amount the mixed gas 48 coming from the right side of the dividing wall 50 and the mixed gas 49c that is half in amount the mixed gas 49 coming from the left side of the dividing wall 50 flow into the communication hole 51 from its upper side. Likewise, the mixed gas 49a that is half in amount the mixed gas 49 coming from the right side of the dividing wall 50 and the mixed gas 48c that is half in amount the mixed gas 48 coming from the left side of the dividing wall 50 flow into the communication hole 51 from its lower side. The mixed gas 48d that is half in amount the mixed gas 48 coming from the lower side of the dividing wall 50 and the mixed gas 49b that is half in amount the mixed gas 49 coming from the upper side of the dividing wall 50 flow into the communication hole 51 from its right side. Likewise, the mixed gas 48b that is half in amount the mixed gas 48 coming from the upper side of the dividing wall 50 and the mixed gas 49d that is half in amount the mixed gas 49 coming from the lower side of the dividing wall 50 flow into the communication hole 51 from its left side. Therefore, even if the spatial distribution of the concentration of the components of the supplied mixed gas is uneven to a considerable extent such as, for example, a case where a mixed gas of high city gas concentration flows from the right side of the dividing wall 50 while a mixed gas of high vapor concentration flowing from the left side, the halves of each mixed gas are fed from the upper side and lower side, respectively, of the communication hole 51, so that the spatial concentration distribution of each component can be uniformed. In other words, there are many chances that a mixed gas of high city gas concentration and a mixed gas of high vapor concentration contact each other, which enables it to make the spatial concentration distribution of each component uniform. In consequence, the mixed gas supplied to an end 52 (see FIG. 1) of the reforming catalyst layer 12 after passing through the catalyst pipe 42 can be prevented from varying in concentration, so that the resultant reformed gas has spatially uniformed concentration. In addition, thanks to the above-described function of the gas mixer 101 for improving the mixed condition of the mixed gas, the mixed condition of city gas and vapor contained in the mixed gas can be improved. Further, by employing the above structure composed of the dividing wall 50, the passage forming members 45a to 45d and 46a to 46d, the heat capacity of the gas mixer 101 can be reduced, which, in consequence, enables it to improve the response of the hydrogen generator 100.

Although the foregoing embodiment has been discussed with a case where one mixer 101 is provided in the disk-like space 41, the invention is not necessarily limited in its application to this but equally applicable to cases where a plurality of mixers are used.

Figure 5A:
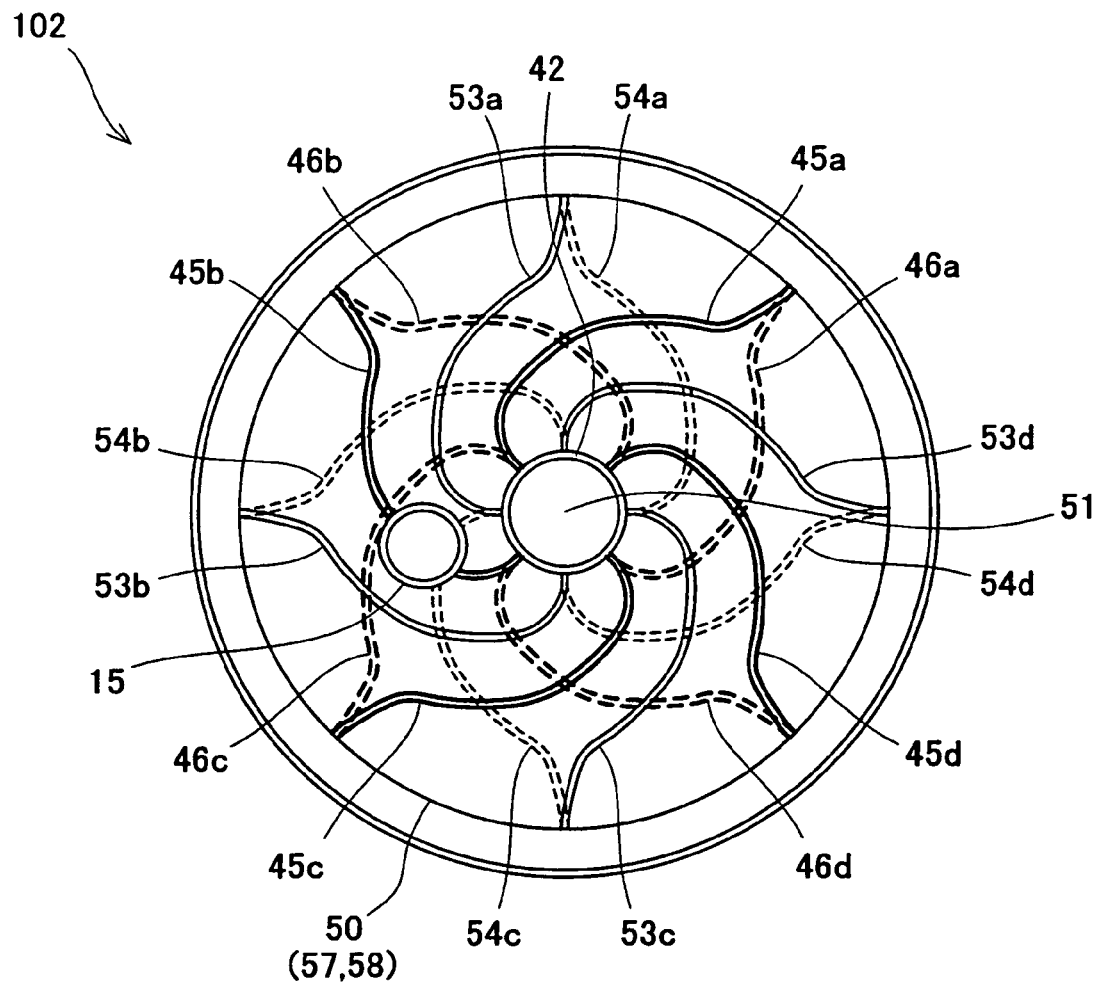
FIG. 5 is structural diagrams each diagrammatically showing an internal configuration of another gas mixer according to the first embodiment of the invention, wherein FIGS. 5(*a*) and 5(*b*) are a plan view and sectional view, respectively, of the gas mixer.
Figure 5B:
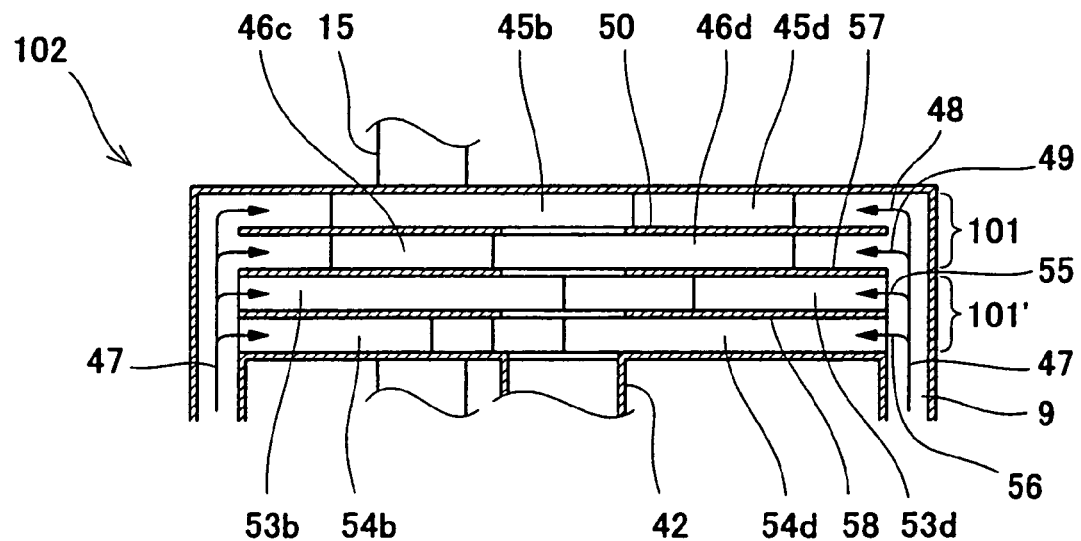

FIG. 5 is structural diagrams each diagrammatically showing the internal configuration of another gas mixer 102 according to the first embodiment of the invention, wherein FIGS. 5(a) and 5(b) are a plan view and sectional view, respectively, of the gas mixer 102. In FIG. 5(a), the upper passage forming members 45a to 45d (described later) of an upper gas mixer of the gas mixer 102 are indicated by thick solid line whereas the lower passage forming members 46a to 46d of the same by thick broken line. The upper passage forming members 53a to 53d and lower passage forming members 54a to 54d of a lower gas mixer are indicated by thin solid line and broken line, respectively. In FIGS. 5(a) and 5(b), the parts thereof corresponding to those of FIGS. 2(a) and 2(b) are identified by the same reference numerals as in FIGS. 2(a) and 2(b).

As shown in FIGS. 5(a) and 5(b), the gas mixer 102 of the first embodiment of the invention is configured such that the pattern of the gas mixer 101 shown in FIGS. 2(a) and 2(b) is piled up twice in the direction of the central axis C. More specifically, the gas mixer 102 takes a double-mixer configuration in which the first gas mixer 101 composed of the dividing wall 50, the passage forming members 45a to 45d and the passage forming members 46a to 46d overlaps a second gas mixer 101' composed of a dividing wall 58, the passage forming members 53a to 53d and the passage forming members 54a to 54d with a disk-like partition plate 57 therebetween, the partition plate 57 having, at its center, an opening of substantially the same diameter as the diameter of the communication hole 51. In the gas mixer 102, as illustrated in FIG. 5(a), the positional relationship between the gas mixer 101 and the second gas mixer 101' is such that the gas mixer 101 is laid over the gas mixer 101' in the direction of the central axis C, being shifted 45 degrees from the gas mixer 101'. Except the above point, the gas mixer 102 does not differ from the gas mixer 101 shown in FIGS. 2(a) and 2(b).

According to the gas mixer 102 of such a configuration, the flow of mixed gas 47 which has passed through the upward flow passage 9 is divided into four streams of mixed gas 48, 49, 55, 56 in the direction of the central axis C by means of the dividing wall 50, the partition plate 57 and the dividing wall 58. Then, these streams of mixed gas 48, 49, 55 and 56 are respectively turned through a specified angle by the passage forming members 45a to 45d, 46a to 46d, 53a to 53d and 54a to 54d, so that the spatial concentration distributions of the city gas and vapor contained in the mixed gas supplied to the catalyst pipe 42 can be further uniformed.

Although the foregoing embodiment has been discussed in the context of four passage forming members which are formed on one face of the dividing wall 50 (or the dividing wall 50 and the dividing wall 58), being equally spaced at 90 degrees apart, the invention is not necessarily limited in its application to this, but is equally applicable to cases where a number of passage forming members are employed and equally spaced at a desired angle apart. In this case, as the separation angle between the passage forming members decreases, in other words, the number of passage forming members increases, the spatial concentration distributions of the city gas and vapor of the mixed gas supplied to the catalyst pipe 42 can be more uniformed.

Figure 6:
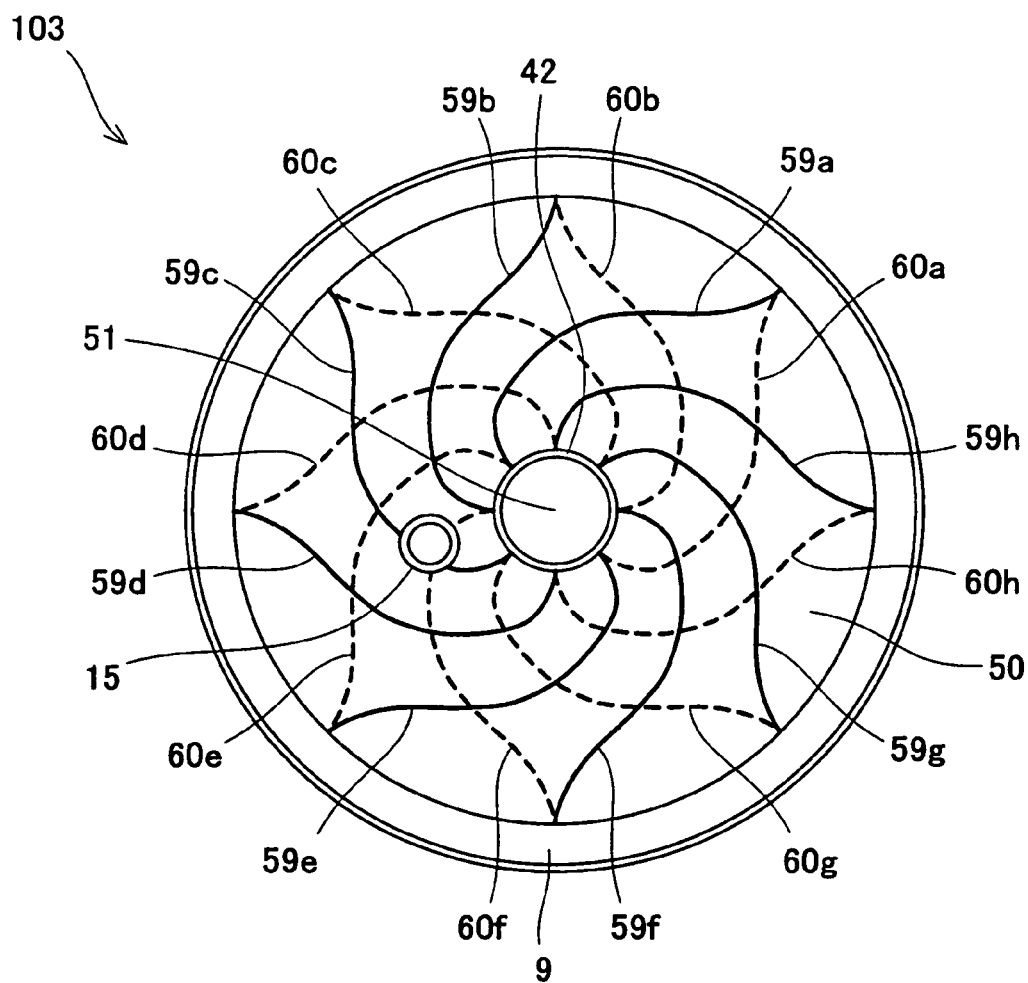
FIG. 6 is a plan view illustrating, as one example, a configuration of a gas mixer having eight passage forming members on one face of the dividing wall.

FIG. 6 is a plan view illustrating, as one example, the configuration of a gas mixer 103 having eight passage forming members on one face of the dividing wall 50. In FIG. 6, upper passage forming members 59a to 59h (described later) in the gas mixer 103 are indicated by solid line and lower passage forming members 60a to 60h by broken line. In FIG. 6, the parts thereof corresponding to those of FIGS. 2(a) and 2(b) are identified by the same reference numerals as in FIGS. 2(a) and 2(b).

As illustrated in FIG. 6, in the gas mixer 103 according to another form of the first embodiment of the invention, eight passage forming members 59a to 59h are formed on the upper side of the dividing wall 50. The passage forming members 59a to 59h are equally spaced at 45 degrees apart on one face of the dividing wall 50. In the gas mixer 103, the passage forming members 60a to 60h are disposed at the lower side of the dividing wall 50, as illustrated in FIG. 6. Like the arrangement of the passage forming members 59a to 59h, the passage forming members 60a to 60h are equally spaced at 45 degrees apart on one face of the dividing wall 50. The gas mixer 103 does not differ from the gas mixer 101 shown in FIGS. 2(a) and 2(b) except this point. By thus increasing the number of passage forming members, the spatial concentration distributions of the city gas and vapor of the mixed gas supplied to the catalyst pipe 42 can be further uniformed.

Although the passage forming members are gently curved as illustrated in FIG. 2(a) in the first embodiment, the shape of the passage forming members is not necessarily limited to this but may be more simplified or complicated according to the flow rate, flowability or the like of the mixed gas to be supplied.

Although the first embodiment has been discussed with cases where city gas is used as the material containing an organic compound composed of at least carbon and hydrogen, the type of the material used in the invention is not necessarily limited to this, but alcohol, LPG, kerosene or the like may be used. The invention is very useful particularly for cases where a liquid fuel such as alcohol and kerosene is used and mixed with water to be evaporated, because in such cases, the material and water tend to spatially vary in concentration.

Second Embodiment

The second embodiment of the invention is associated with a technique in which a gas mixer is provided, for instance, between the reformed gas supply passage for flowing the supplied mixed gas and the reactor section for proceeding the steam reforming reaction to generate the reformed gas, in order that the mixed condition of the mixed gas in a vertical direction is improved by the gas mixer.

Figure 7:
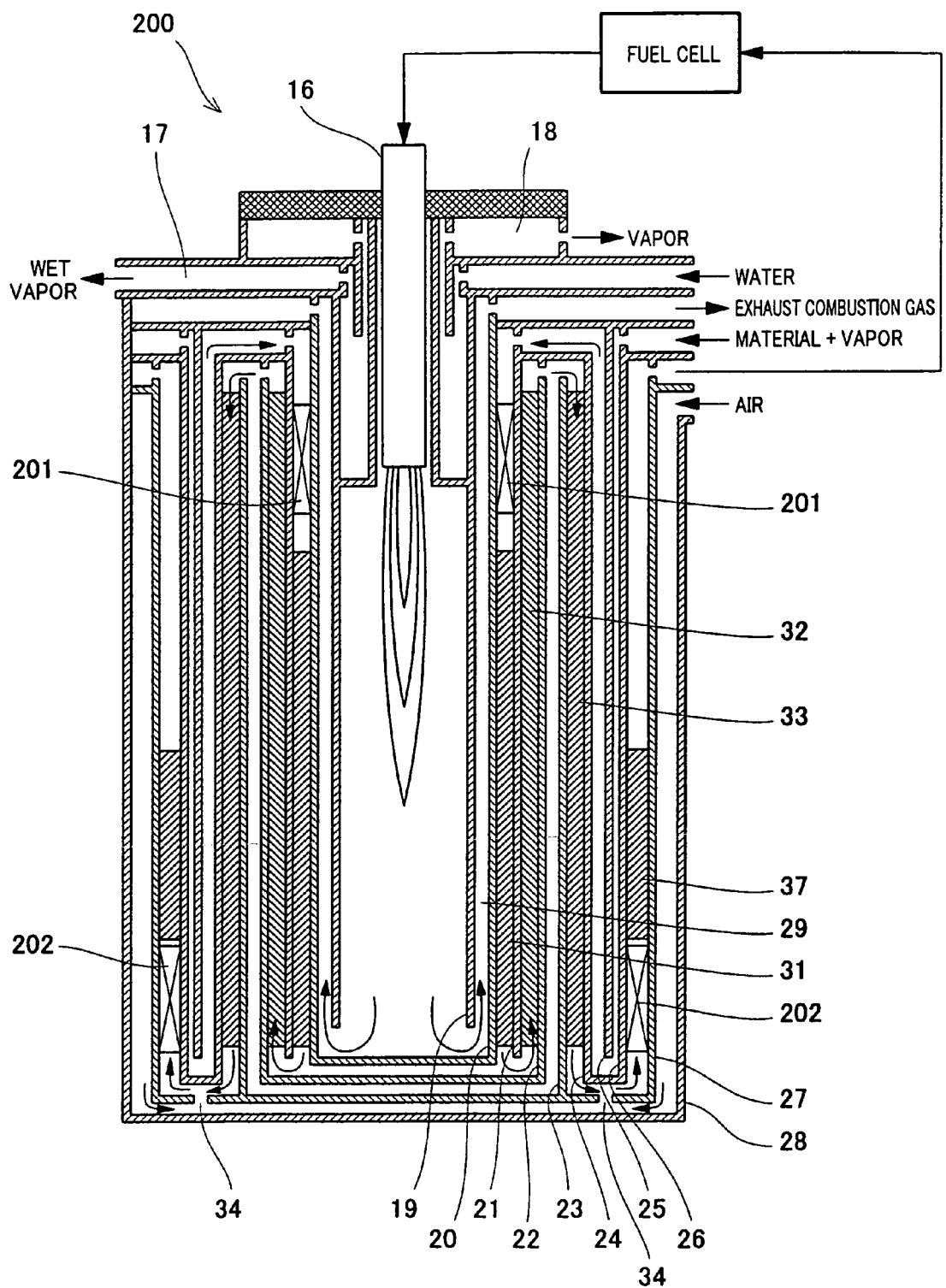
FIG. 7 is a longitudinal sectional view diagrammatically showing an internal configuration of a hydrogen generator according to a second embodiment of the invention.

First, reference is made to FIG. 7 to describe the fundamental configuration and operation of a hydrogen generator 200 constructed according to the second embodiment of the invention.

FIG. 7 is a longitudinal sectional view diagrammatically showing the internal configuration of the hydrogen generator 200 according to the second embodiment of the invention. In FIG. 7, arrows indicate the flows of gas such as the material and vapor.

As illustrated in FIG. 7, the hydrogen generator 200 of the second embodiment has a concentric multiple cylindrical configuration similarly to the configuration of the hydrogen generator 100 of the first embodiment. More specifically, the hydrogen generator 200 has a combustion burner 16 for generating high temperature combustion gas used for proceeding the steam reforming reaction and heaters 17, 18 that are supplied with water and heated by the combustion burner 16 to generate wet vapor or vapor. The hydrogen generator 200 has, in a plurality of annular spaces defined by a plurality of concentric cylinders 19 to 28 disposed around the combustion burner 16, (a) a combustion gas passage 29 for letting high-temperature combustion gas generated by the combustion burner 16 pass therethrough; (b) a gas mixer 201 for mixing the material and vapor to bring the mixed gas into a uniformly mixed condition before it is used for the steam reforming reaction; (c) a reforming catalyst layer 31 that is heated to a specified reaction temperature to promote the steam reforming reaction; (d) a heat recovery layer 32 for collecting heat to lower the temperature of the high-temperature reformed gas generated by the reforming catalyst layer 31; (e) a shift catalyst layer 33 for reducing, through a specified chemical reaction, the carbon monoxide concentration of the reformed gas cooled by the heat recovery layer 32; (f) a gas mixer 202 which has the same configuration as that of the gas mixer 201, for thoroughly mixing the reformed gas with air taken from the air feed section 34 that feeds air for the selective oxidation reaction, the reformed gas having been reduced in carbon monoxide concentration by the shift catalyst layer 33; and (g) a selective oxidation catalyst layer 37 for further reducing the carbon monoxide concentration of the reformed gas through the selective oxidation reaction, the reformed gas having passed through the gas mixer 202 so that it was thoroughly mixed with air. These members are concentrically arranged in cylindrical form around the combustion burner 16, similarly to the case of the hydrogen generator 100 of the first embodiment shown in FIG. 1. Although the plurality of annular spaces are defined by the plurality of concentric cylinders 19 to 28 in the second embodiment, the invention is not necessarily limited to this but equally applicable to cases where spaces of any other tubular shapes are employed in place of the annular spaces, provided that they are concentric.

As described earlier, in the hydrogen generator 200 of the second embodiment, the gas mixer 201 for thoroughly mixing the supplied material and vapor which characterizes the invention is positioned above the reformed catalyst layer 31 that is provided in the annular space defined by the concentric cylinders 20, 21. This gas mixer 201 has the shape of a ring fittable in the annular space defined by the concentric cylinders 20, 21 and is fixed by a specified fixing means at a specified position above the reformed catalyst layer 31 within the annular space defined by the concentric cylinders 20, 21. In the hydrogen generator 200 of the second embodiment, the gas mixer 202 for thoroughly mixing the supplied reformed gas and air which characterizes the invention is placed under the selective oxidation catalyst layer 37 within the annular space defined by the concentric cylinders 26, 27. This gas mixer 202 has the shape of a ring fittable in the annular space defined by the concentric cylinders 26, 27 and is fixed by a specified fixing means at a specified position under the selective oxidation catalyst layer 37 within the annular space defined by the concentric cylinders 26, 27. The details of the configuration of the gas mixer 202 will be described as a representative of the gas mixers 201, 202.

In the hydrogen generator 200 of the second embodiment having the above configuration, water to be used for the steam reforming reaction is supplied to the heater 17 or 18 and at least part of it evaporates. The water (warm water) discharged from the heater 17 or 18 is primarily mixed with city gas serving as the material in a mixing section (not shown in FIG. 7) and then completely evaporates, being mixed with the city gas, while passing through the space between the concentric cylinders 25, 26 and the space between the concentric cylinders 24, 25. Then, the mixed gas of the city gas and vapor is supplied to the gas mixer 201. The mixed gas is thoroughly mixed while passing through the gas mixer 201, and thereafter, it is supplied to the reforming catalyst layer 31. The function of the gas mixer 201 for improving the mixed condition of the mixed gas will be later described in detail through a description of the gas mixer 202.

The mixed gas obtained by thoroughly mixing the city gas and vapor in the gas mixer 201 is then supplied to the reforming catalyst layer 31. This reforming catalyst layer 31 is heated by the combustion gas flowing in the combustion gas passage 29 and utilized for the progressing steam reforming reaction so that hydrogen-rich reformed gas is generated from the mixed gas. After the reformed gas generated through the steam reforming reaction is cooled down to a specified temperature, while passing through the heat recovery layer 32, it is supplied to the shift catalyst layer 33. By the shift reaction progressing in the shift catalyst layer 33, most of carbon monoxide contained in the reformed gas is eliminated.

The reformed gas, from which most carbon monoxide has been eliminated by the shift catalyst layer 33, is then supplied to the gas mixer 202 which, in turn, thoroughly mixes the reformed gas after passing through the shift catalyst layer 33 with air taken from the air feed section 34. After thoroughly mixed with air supplied from the air feed section 34 while passing through the gas mixer 202, the reformed gas is supplied to the selective oxidation catalyst layer 37. The function of the gas mixer 202 for improving the mixed condition of the reformed gas and air will be later discussed in detail in conjunction with the gas mixer 201 described earlier.

The reformed gas which has been thoroughly mixed with air by the gas mixer 202 is supplied to the selective oxidation catalyst layer 37 in order that a small amount of carbon monoxide remaining in the reformed gas is mostly removed therefrom. By the selective oxidation reaction progressing in the selective oxidation catalyst layer 37, most of the carbon monoxide contained in the reformed gas is removed by the combustion which utilizes air. It should be noted that the reformed gas from which carbon monoxide has been thoroughly removed is supplied to the fuel cell and utilized for the chemical reaction for power generation in the fuel cell. The remaining reformed gas which has not been used for the power generation in the fuel cell is supplied to the combustion burner 16 to be reused for generating combustion gas in the combustion burner 16.

Next, the configuration of the gas mixer 202 of the second embodiment of the invention will be described in details with reference to the drawings.

Figure 8:
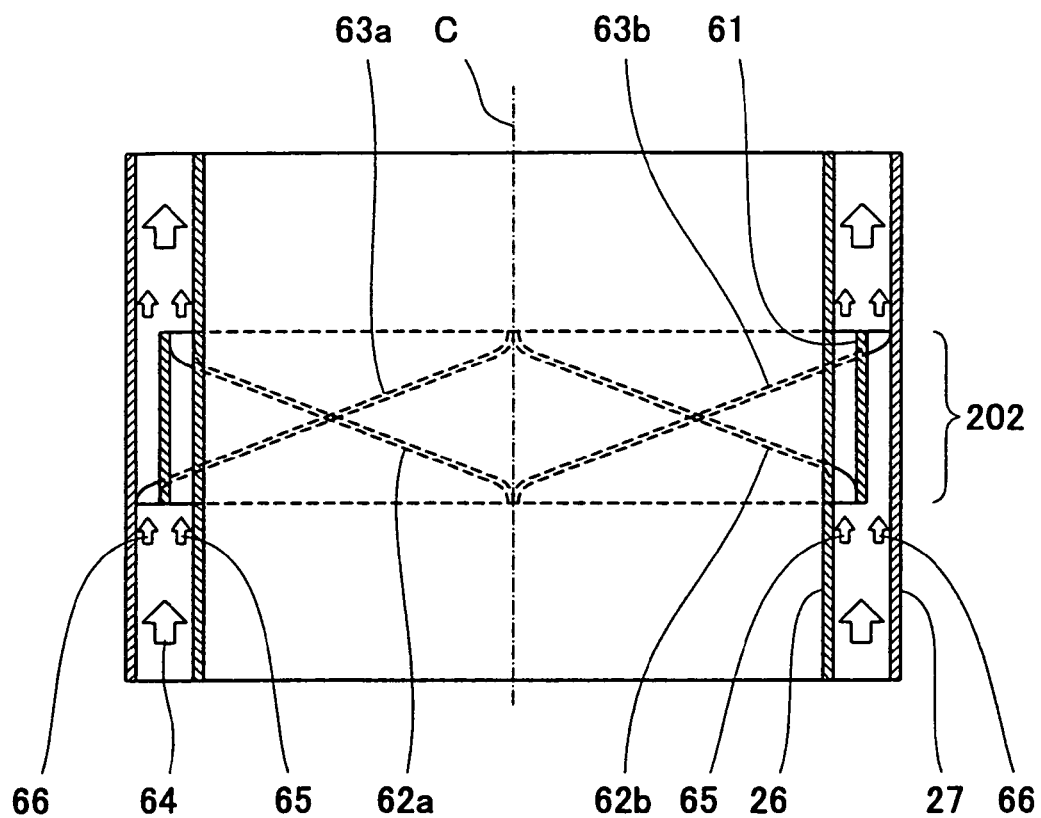
FIG. 8 is a longitudinal sectional view diagrammatically showing an internal configuration of a gas mixer according to the second embodiment of the invention.

FIG. 8 is a longitudinal sectional view diagrammatically showing the internal configuration of the gas mixer 202 according to the second embodiment of the invention. FIG. 8 skips illustration of inner passage forming members 62c to 62d and outer passage forming members 63c to 63d (later described) which are disposed in the gas mixer 202, being located on the side of a person viewing the drawing. In FIG. 8, the visible parts of the inner passage forming members 62a to 62b and outer passage forming members 63a to 63b are indicated by solid line and the invisible parts of them by broken line.

The configuration of the gas mixers will be fully explained taking the gas mixer 202 for example.

As illustrated in FIG. 8, the gas mixer 202 of this embodiment has a cylindrical mixing concentric cylinder 61 for laterally (radially) dividing the stream of reformed gas 64 into two, i.e., the streams of reformed gas 65, 66, the reformed gas 64 having been supplied with air that flows upwardly within the annular space defined by the concentric cylinders 26, 27 shown in FIG. 7. Formed between the mixing concentric cylinder 61 and the concentric cylinder 26 shown in FIG. 7 are the four helical inner passage forming members 62a to 62d which spiral counterclockwise in a rising direction of the reformed gas 64 (It should be noted the inner passage forming members 62c and 62d located on the side of a person viewing FIG. 8 are not shown in the drawing). These passage forming members 62a to 62d are so formed that the reformed gas 65 can spirally flow counterclockwise in the rising direction of the reformed gas 64. As illustrated in FIG. 8, the four outer passage forming members 63a to 63d which spiral clockwise in the rising direction of the reformed gas 64 are formed between the mixing concentric cylinder 61 and the concentric cylinder 27 shown in FIG. 7, such that the reformed gas 66 can spirally flow clockwise in the rising direction of the reformed gas 64 (It should be noted the outer passage forming members 63c and 63d located on the side of a person viewing FIG. 8 are not shown in the drawing). In the gas mixer 202, the flow of reformed gas 64 is divided into the streams of reformed gas 65, 66 by the mixing concentric cylinder 61, the inner passage forming members 62a to 62d and the outer passage forming members 63a to 63d, and turning passages are formed which allow the divided flows of reformed gas 65, 66 to turn around the central axis C in opposite directions.

In the gas mixer 202 of the second embodiment, the inner passage forming members 62a to 62d and the outer passage forming members 63a to 63d are respectively constituted by a specified lateral wall. The inner passage forming members 62a to 62d and the outer passage forming members 63a to 63d are so provided that the space between the mixing concentric cylinder 61 and the concentric cylinder 26 and the space between the mixing concentric cylinder 61 and the concentric cylinder 27 are respectively circumferentially divided into four spaces. The inner passage forming members 62a to 62d and the outer passage forming members 63a to 63d respectively turn 90 degrees in opposite circumferential directions (clockwise and counterclockwise) along the upward flow of the reformed gas 64 in each of the four spaces. Taking one of the four spaces in which the inner passage forming member 62a and outer passage forming member 63a are located for example, the upper end of the outer passage forming member 63a is located at a position opposed to the lower end of the inner passage forming member 62a, whereas the lower end of the outer passage forming member 63a is located at a position opposed to the upper end of the inner passage forming member 62a. The upper end of the inner passage forming member 62a is 90 degrees away from the lower end of the same. Similarly, the upper end of the outer passage forming member 63a is 90 degrees away from the lower end of the same. Thus, the gas mixer 202 of the second embodiment is configured such that the flows of reformed gas 65, 66 separated by the mixing concentric cylinder 61 turn 90 degrees around the central axis C in opposite directions. It is preferable that the above-described inner passage forming members 62a to 62d and outer passage forming members 63a to 63d have the same configuration in order that the reformed gas flows at the same flow rate in the passages defined by these members.

Next, the function of the gas mixer 202 of the second embodiment for improving the mixed condition of the reformed gas will be described in detail, referring to the drawings.

Figure 9A:
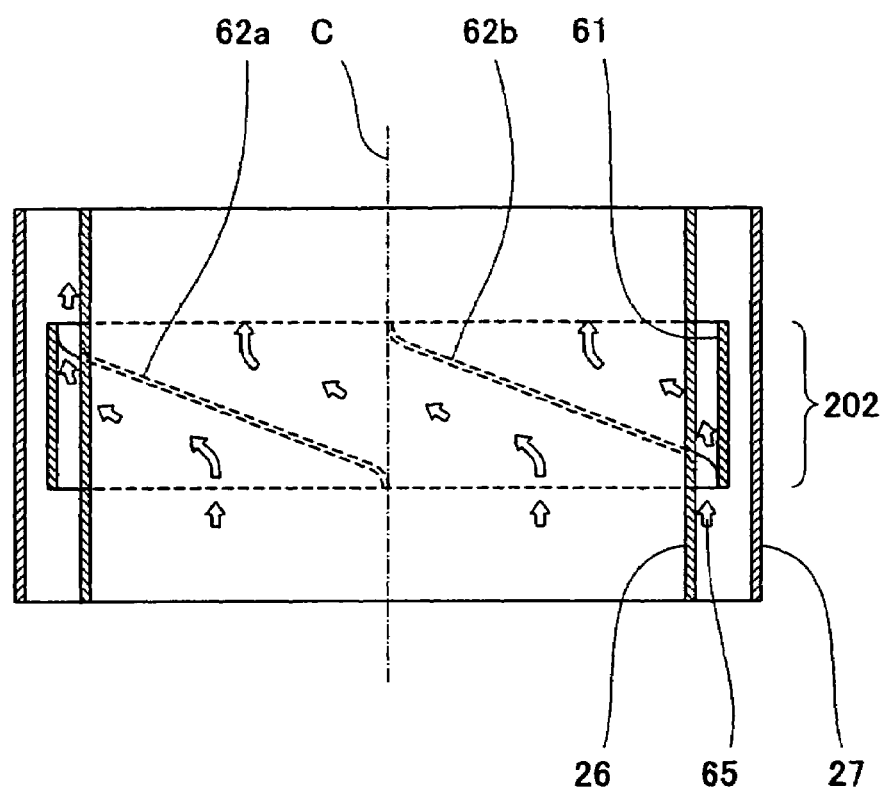
FIG. 9 is explanatory diagrams each diagrammatically showing a flow of reformed gas in a gas mixer, wherein FIG. 9(*a*) is an explanatory diagram diagrammatically showing a flow of mixed gas located inside and divided by a mixing concentric cylinder and FIG. 9(*b*) is an explanatory diagram diagrammatically showing a flow of mixed gas located outside and divided by the mixing concentric cylinder.
Figure 9B:
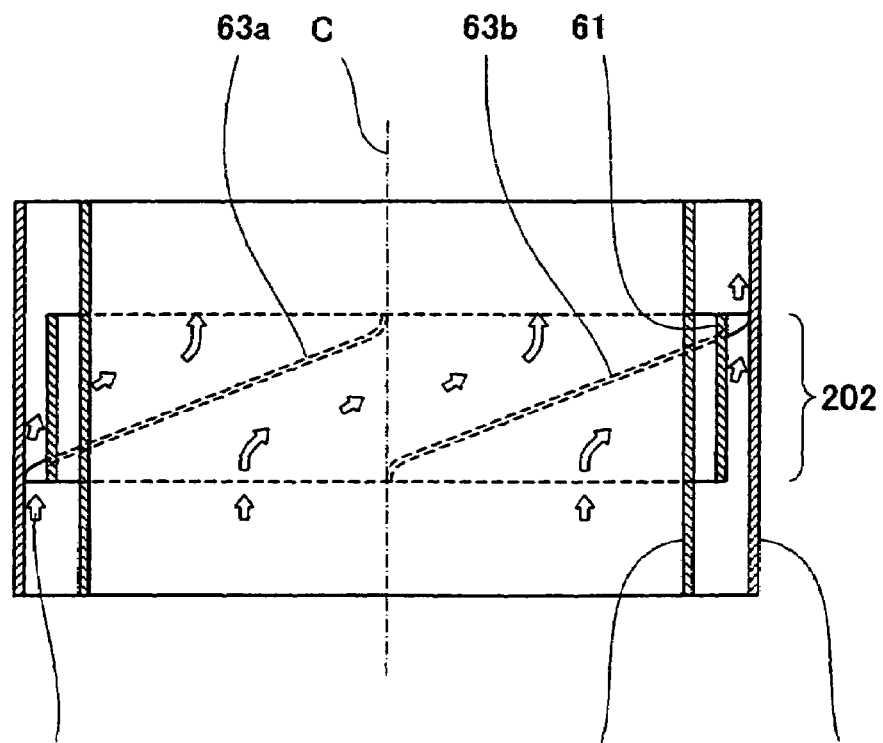

FIG. 9 is explanatory diagrams diagrammatically showing the flows of reformed gas in the gas mixer 202, wherein FIG. 9(a) is an explanatory diagram diagrammatically showing the flow of reformed gas 65 located inside and divided by the mixing concentric cylinder 61 and FIG. 9(b) is an explanatory diagram diagrammatically showing the flow of reformed gas 66 located outside and divided by the mixing concentric cylinder 61. It should be noted that FIGS. 9(a) and 9(b) are longitudinal views when viewed in the same direction as of the longitudinal view of FIG. 8. In FIGS. 9(a) and 9(b), the flows of reformed gas 65, 66 coming from the underside of the mixing concentric cylinder 61 are indicated by arrow for descriptive purposes.

As illustrated in FIG. 9(a), in the gas mixer 202 of the second embodiment, the reformed gas 65, which has come up to the mixing concentric cylinder 61 after upwardly flowing between the concentric cylinders 26 and 27 and has been divided by the mixing concentric cylinder 61 so as to flow inside the cylinder 61, is counterclockwise turned 90 degrees around the central axis C by the inner passage forming members 62a, 62b. Thereafter, the reformed gas 65 is discharged from the upper side of the gas mixer 202. As shown in FIG. 9(b), in the gas mixer 202 of the second embodiment, the reformed gas 66, which has come up to the mixing concentric cylinder 61 after upwardly flowing between the concentric cylinders 26 and 27 and has been divided by the mixing concentric cylinder 61 so as to flow outside the cylinder 61, is clockwise turned 90 degrees around the central axis C by the outer passage forming members 63a, 63b. Thereafter, the reformed gas 66 is discharged from the upper side of the gas mixer 202. The reformed gas 64 introduced into the gas mixer 202 is divided into two streams of reformed gas 65, 66 by the mixing concentric cylinder 61, the inner passage forming members 62a to 62d, and the outer passage forming members 63a to 63b. The streams of reformed gas 65, 66 turn 90 degrees counterclockwise and clockwise respectively and then join together, mixing with each other.

Figure 10:
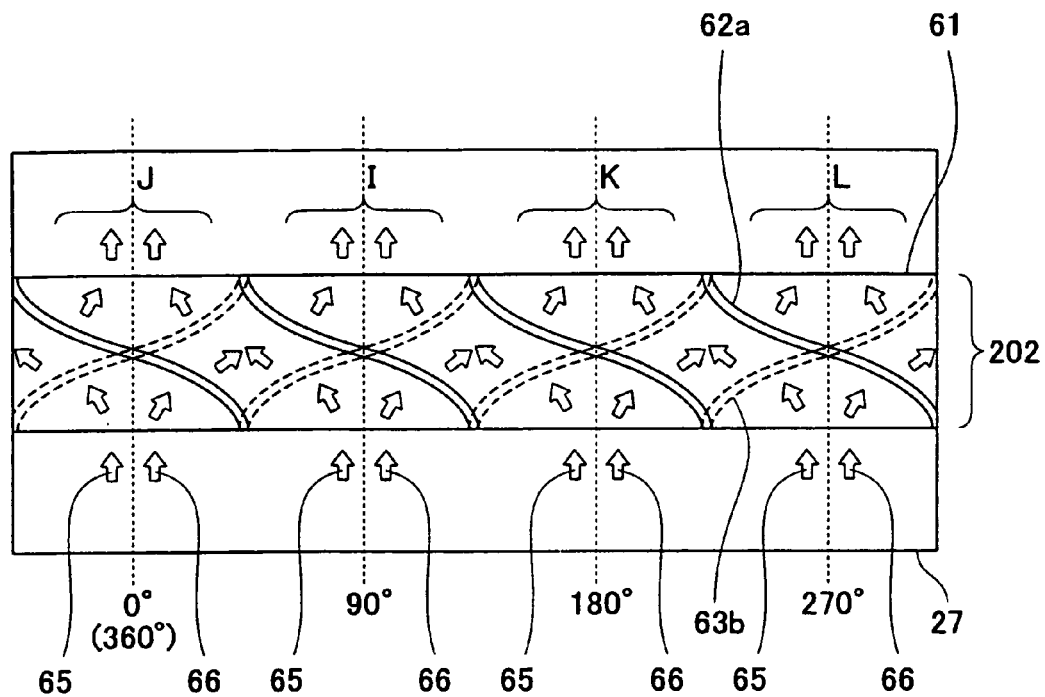
FIG. 10 is an explanatory diagram more plainly illustrating the operation of the gas mixer according to the embodiment shown in FIG. 9.

FIG. 10 is an explanatory diagram more plainly illustrating the operation of the gas mixer 202 of the second embodiment shown in FIG. 9. It should be noted FIG. 10 is an explanatory view diagrammatically showing the gas mixer 202 shown in FIG. 9 when being rotated 360 degrees on the central axis C. In FIG. 10, the inner passage forming members 62a to 62d which are visible directly from the viewpoint of the central axis C of the gas mixer 202 are indicated by solid line and the outer passage forming members 63a to 63d which are invisible directly from the viewpoint of the central axis C of the gas mixer 202 are indicated by broken line. The circumference of the gas mixer 202 is divided into four parts which are equally spaced at 90 degrees apart and these parts are indicated by broken lines marked with 0°, 90°, 180° and 270° respectively.

As illustrated in FIG. 10, in the gas mixer 202 of the second embodiment, the reformed gas 65 flowing inside the mixing concentric cylinder 61 turns 90 degrees counterclockwise within the mixer 202, whereas the reformed gas 66 flowing outside the mixing concentric cylinder 61 turns 90 degrees clockwise within the mixer 202. Thereafter, the reformed gases 65, 66 go out of the upper side of the gas mixer 202 and then mix together at the outlet of the gas mixer 202. In this case, it is apparent that the reformed gas discharged from the outlet position I at 90° shown in FIG. 10 is a mixture of one-half the reformed gas coming from the position 0° shown in FIG. 10 and one-half the reformed gas coming from the position 180° shown in FIG. 10. It is also apparent from FIG. 10 that each of the fluids discharged from other outlet positions J to L is a mixture of halves of reformed gases coming from positions which are 180 degrees apart from each other, similarly to the case of the fluid discharged from the outlet position I. According to the gas mixer 202 of the second embodiment, since halves of the mixed gases coming from positions which are 180 degrees apart from each other can be mixed together by the inner passage forming members 62a to 62d and the outer passage forming members 63a to 63d, it becomes possible to effectively mix mixed gases flowing in opposite positions which are 180 degrees apart from each other in the annular passage defined by the concentric cylinders 26, 27. In short, since there are many chances that two kinds of mixed gases present in positions remote from each other meet each other similarly to the case of the first embodiment, the spatial concentration distributions can be uniformed.

According to the gas mixer 202 of the second embodiment, since the inner passage forming members 62a to 62d and outer passage forming members 63a to 63d of the gas mixer 202 are constituted by a lateral wall, heat capacity becomes small and the wait time required for start-up or eliminating load fluctuations can be reduced. In addition, since the gas mixer 202 of the second embodiment exhibits good mixing performance, a simplified configuration can be employed according to which the two mixing layers 35, 36 and the two selective oxidation catalyst layers 37, 38 required for the conventional hydrogen generator 300 can be replaced with the single gas mixing layer 202 and the single selective oxidation catalyst layer 37, respectively. Therefore, the heat capacity of the hydrogen generator 200 can be further reduced and the amount of air used for the selective oxidation reaction can be kept to the minimum necessary. As a result, wasteful consumption of generated hydrogen by air for the selective oxidation can be restrained, which leads to accomplishment of the high-efficiency hydrogen generator 200.

Figure 11:
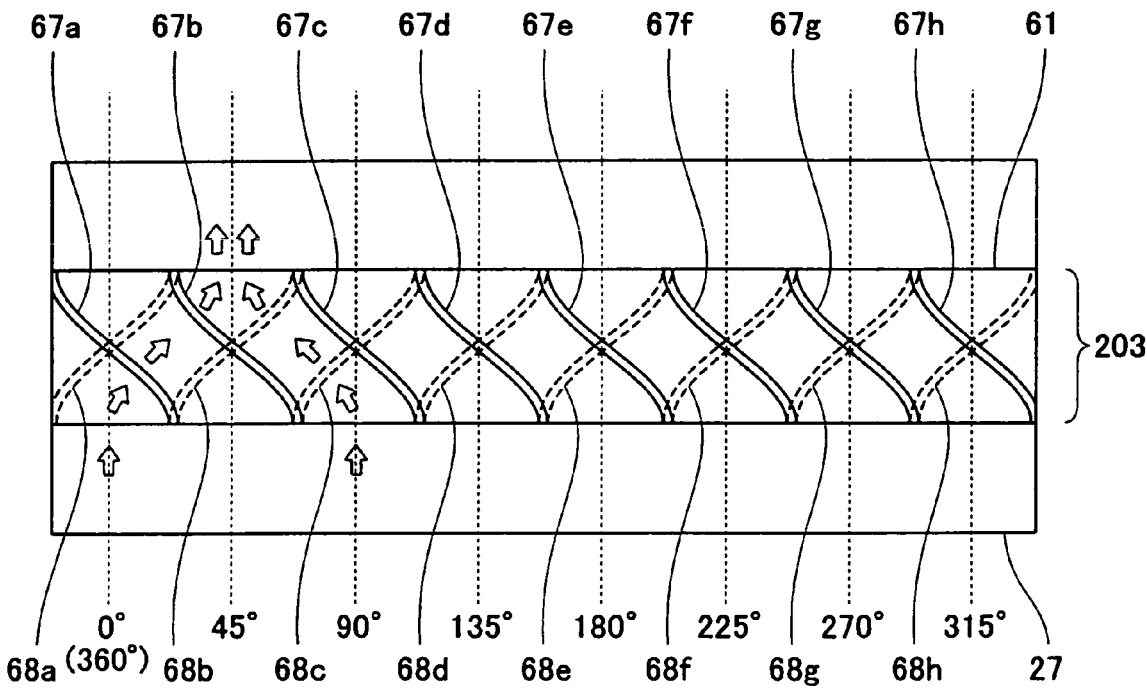
FIG. 11 is a longitudinal sectional view diagrammatically showing an internal configuration of another gas mixer according to the second embodiment of the invention.

Although the second embodiment has been discussed in the context of the gas mixer 202 having four inner passage forming members 62a to 62d on one side of the mixing concentric cylinder 61 and four outer passage forming members 63a to 63d on the other side, the invention is not necessarily limited to this, but equally applicable to, for example, the case where, as shown in FIG. 11, there are provided, on the sides of the mixing concentric cylinder 61, eight inner passage forming members 67a to 67h equally spaced at 45 degrees apart and eight outer passage forming members 68a to 68h equally spaced at 45 degrees apart. In this case, the inner passage forming members 67a to 67h and outer passage forming members 68a to 68h are able to turn the streams of reformed gas 65, 66 shown in FIG. 8 through 45 degrees in opposite directions. With this arrangement, the flows of reformed gas present at positions that are 90 degrees apart from each other in a circumferential direction in the inlet of a gas mixer 203 can be effectively mixed as shown in FIG. 11 in which the flows of reformed gas are indicated by two arrows.

Figure 12:
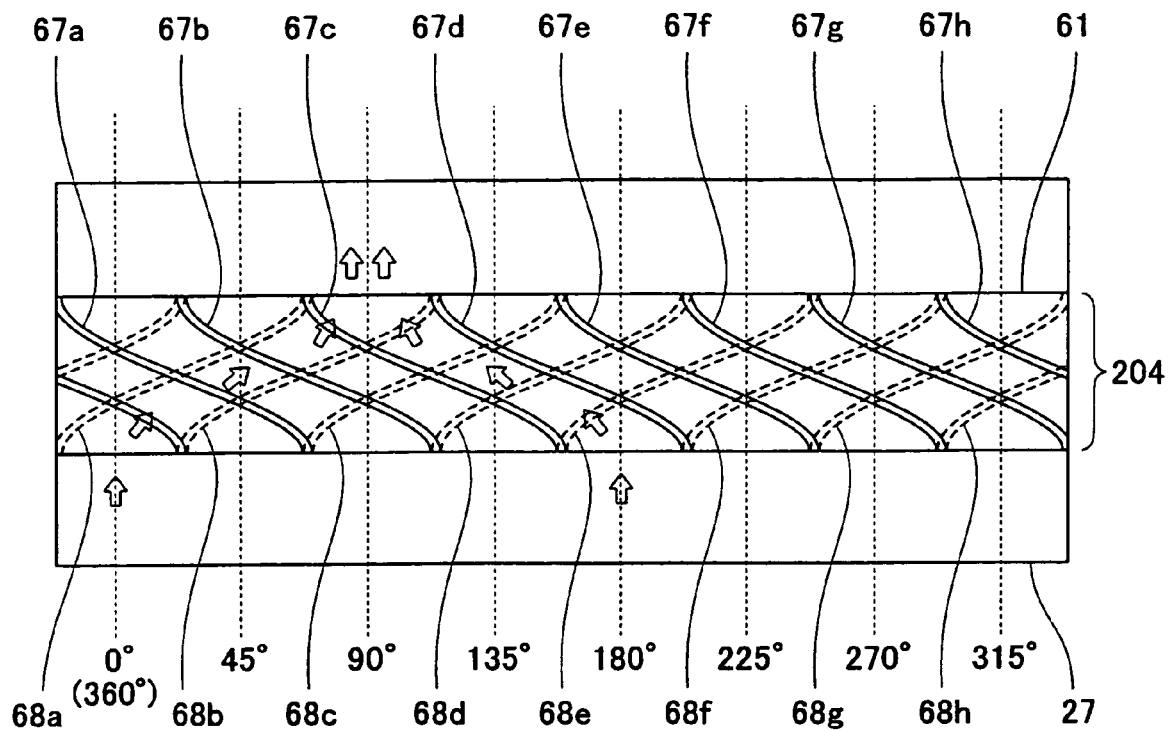
FIG. 12 is a longitudinal sectional view diagrammatically showing an internal configuration of still another gas mixer according to the second embodiment of the invention.

Although the second embodiment has been discussed in terms of the gas mixer 202 having four inner passage forming members 62a to 62d and four outer passage forming members 63a to 63d which are disposed on the sides of the mixing concentric cylinder 61, the invention is not necessarily limited to this but equally applicable to cases where as shown in FIG. 12, there are provided, on the sides of the mixing concentric cylinder 61, eight inner passage forming members 67a to 67h equally spaced at 90 degrees apart and eight outer passage forming members 68a to 68h equally spaced at 90 degrees apart. In this case, the inner passage forming members 67a to 67h and outer passage forming members 68a to 68h are able to turn the streams of reformed gas 65, 66 shown in FIG. 8 through 90 degrees in opposite directions. With this arrangement, the flows of reformed gas present at positions that are 180 degrees apart from each other in a circumferential direction in the inlet of a gas mixer 204 can be more effectively mixed as shown in FIG. 12 in which the flows of reformed gas are indicated by two arrows.

According to this embodiment, the number of inner and outer passage forming members in the gas mixer 202 may be varied according to the type of the reformed gas or required mixed conditions, which enables it to achieve a further improved effect. In addition, the shape of the inner and outer passage forming members is not limited to the curve profiles shown in FIGS. 8 to 12 but may be modified variously. For instance, linear shapes or combinations of linear shapes and curved shapes may be employed with the intention of achieving more effective mixing or reducing pressure loss.

Figure 13:
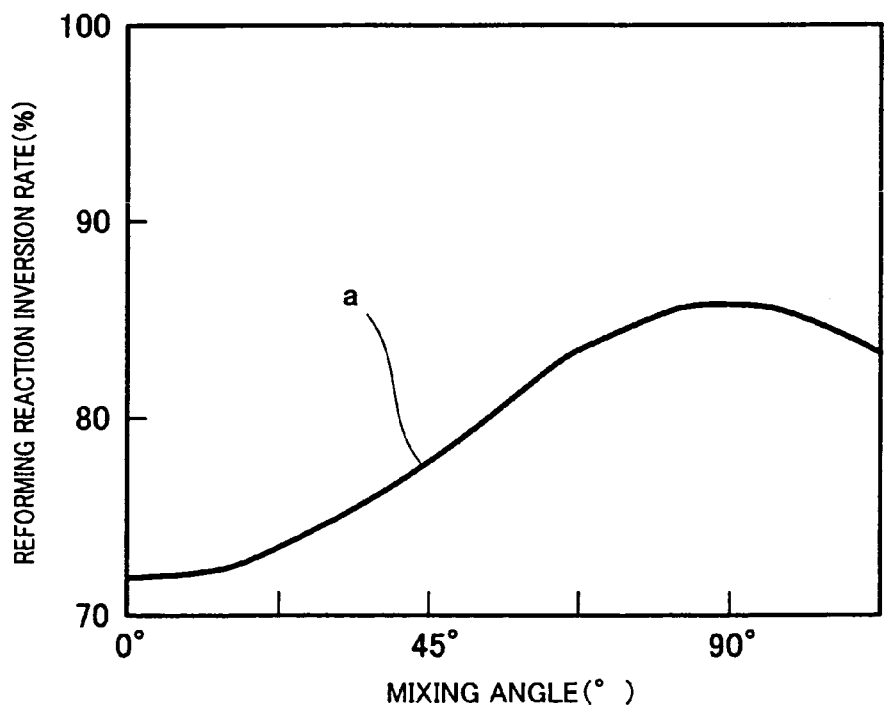
FIG. 13 is a correlation diagram diagrammatically showing the relationship between the turning angle of a mixed gas of a first fluid (e.g., material) and a second fluid (e.g., vapor) in the gas mixer of the present embodiment and the reforming reaction inversion rate in a reforming catalyst layer when using the mixed gas which has passed through the gas mixer.

FIG. 13 is a correlation diagram diagrammatically showing the relationship between the mixing angle of the mixed gas, i.e., the mixing angle of a first fluid (e.g., material) and a second fluid (e.g., vapor) in the gas mixer 201 of the present embodiment and the reforming reaction inversion rate in the reforming catalyst layer when using the mixed gas which has passed through the gas mixer 201. The curve shown in FIG. 13 indicates the correlation between the turning angle of the mixed gas and the reforming reaction inversion rate. In FIG. 13, the reforming reaction inversion rate (%) in the reforming catalyst layer is plotted on the ordinate and the mixing angle (0) of the first and second fluids of the mixed gas on the abscissa.

It is understood from FIG. 13 that an improved reaction inversion rate for the steam reforming reaction and improved reforming efficiency can be achieved with the provision of the gas mixer 201 on the upstream side of the reforming catalyst layer 31: It is also understood from FIG. 13 that when the turning angle of the mixed gas is 90 degrees, the highest inversion rate can be obtained. If the turning angle of the mixed gas is smaller than 45 degrees, the inversion rate can be increased but its effect is comparatively small. In view of this, it is beneficial for the gas mixer 201 of the second embodiment to make the turning angle of the mixed gas turned by the inner and outer passage forming members be not less than 45 degrees nor more than 90 degrees.

The second embodiment exemplifies cases where the inner and outer passage forming members are respectively constituted by a lateral wall. In this case, three-dimensional molding of the lateral wall becomes necessary, which may cause an increase in the manufacturing cost of the gas mixer. In view of this, the inner and outer passage forming members may be formed from bar materials such as round bars and square bars instead of employing the arrangement in which they are defined by a lateral wall. In this case, three-dimensional molding of bar materials such as round or square bars is relatively easy and therefore an increase in the manufacturing cost of the gas mixer can be avoided.

While the configuration and operation of the gas mixer 202 has been explained in detail in the second embodiment, the configuration and operation of the gas mixer 201 is the same as those of the gas mixer 202. While the second embodiment has been discussed in terms of the arrangement in which the gas mixer 201 is provided for mixing the material supplied to the reforming catalyst layer 31 with vapor and the gas mixer 202 is provided for mixing the reformed gas supplied to the selective oxidation catalyst layer 37 with air, the invention is not necessarily limited, in application, to this but is equally applicable to cases where either of the gas mixers is provided in accordance with the performance required for the hydrogen generator.

Third Embodiment

The third embodiment of the invention differs from the configuration of the hydrogen generator 200 of the second embodiment only in the internal configuration of the gas mixer. Therefore, in the third embodiment, only the internal configuration of the gas mixer will be explained.

Figure 14A:
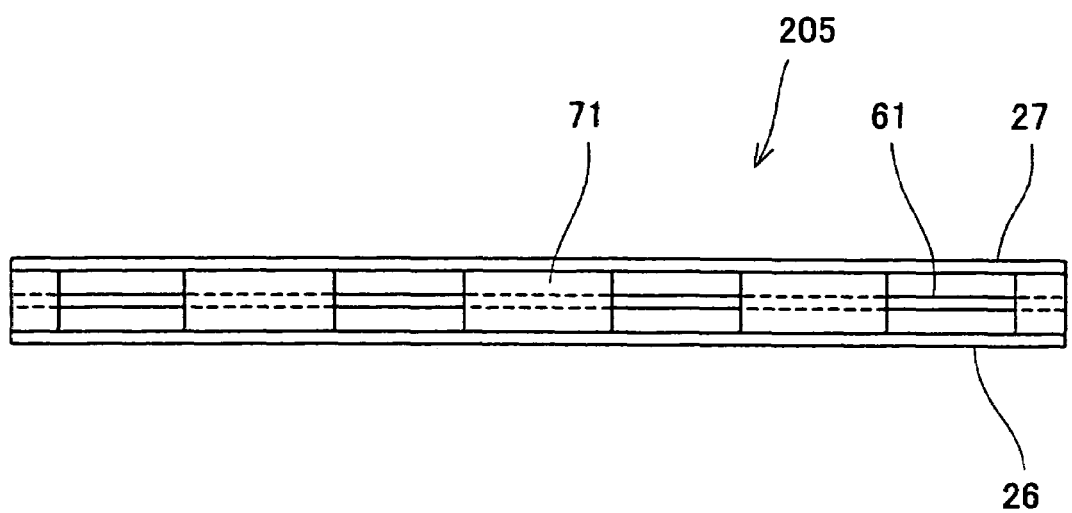
FIG. 14 is structural diagrams each diagrammatically showing an internal configuration of a gas mixer according to a third embodiment of the invention, wherein FIGS. 14(*a*), 14(*b*) are a top view and side view, respectively, of the gas mixer.
Figure 14B:
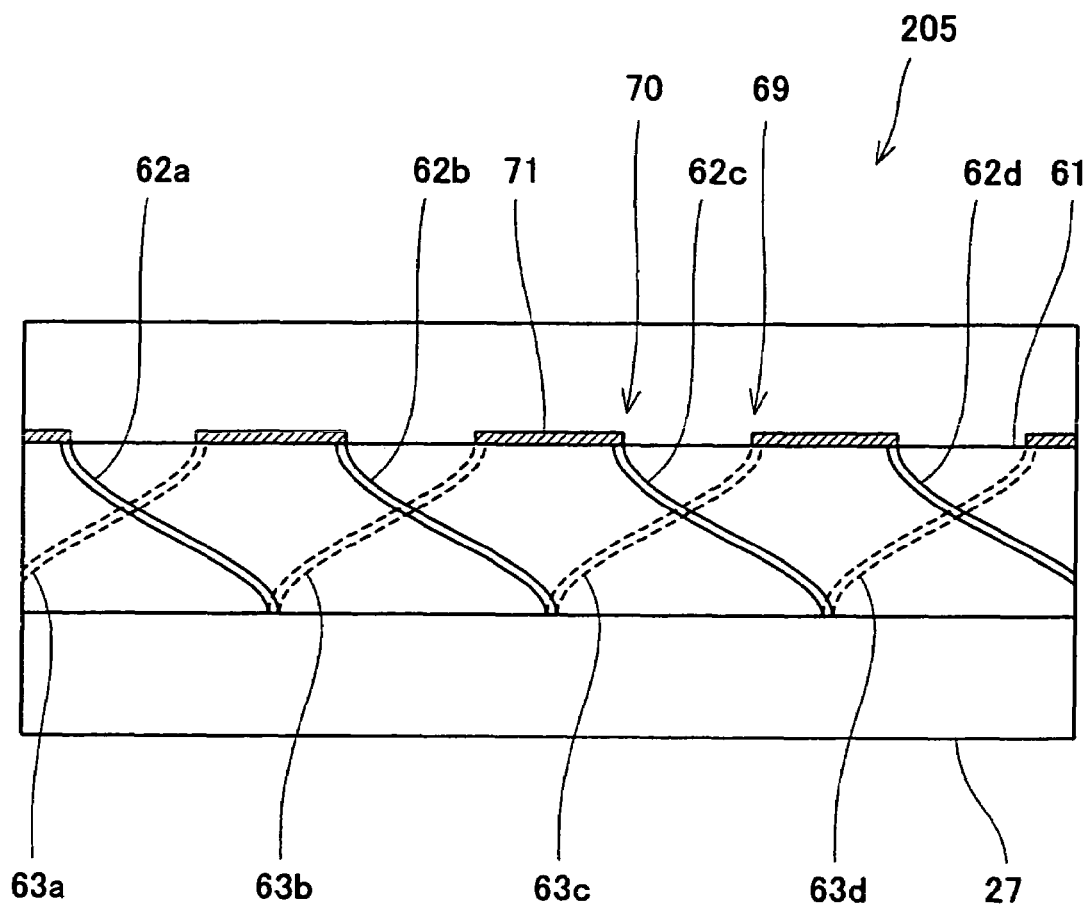

FIG. 14 is structural diagrams each diagrammatically showing the internal configuration of a gas mixer 205 according to the third embodiment of the invention, wherein FIGS. 14(a), 14(b) are a top view and side view, respectively, of the gas mixer 205. FIGS. 14(a), 14(b) diagrammatically show the ring-shaped gas mixer 205 when transformed into a flat form for descriptive purposes. In FIG. 14(a), the visible parts of the concentric cylinders 26, 27 and the mixing concentric cylinder 61 are indicated by solid line whereas invisible parts of them by broken line. In FIG. 14(b), the inner passage forming members 62a to 62d located on the side of a person viewing the drawing are indicated by solid line, whereas the outer passage forming members 63a to 63d located on the side opposite to the above side are indicated by broken line. In FIG. 14, the parts thereof corresponding to those of the gas mixer 202 shown in FIG. 8 are identified with the same reference numerals as of FIG. 8. The description with reference to FIG. 14 is based on the assumption that a fluid such as the mixed gas of the material (e.g., city gas) and vapor or the reformed gas mixed with air flows upwardly from the lower part of FIG. 14.

Basically, the gas mixer 205 of the third embodiment has substantially the same internal configuration as of the gas mixer 202 shown in FIG. 8. As illustrated in FIGS. 14(a) and 14(b), the gas mixer 205 of the third embodiment has, on both sides of the dividing wall 61, four inner passage forming members 62a to 62d and four outer passage forming members 63a to 63d.

The gas mixer 205 of the third embodiment, however, differs from the gas mixer 202 of the second embodiment in that as shown in FIGS. 14(a) and 14(b), about half of each of outlets 69 for the fluid such as the mixed gas guided by the inner passage forming members 62a to 62d and about half of each of outlets 70 for the fluid such as the mixed gas guided by the outer passage forming members 63a to 63d are respectively closed by a rectangular baffle plate 71. More specifically, the gas mixer 205 of the third embodiment differs from the configuration of the gas mixer 202 of the second embodiment in that the opening area of each outlet 69, 70 is reduced by providing a baffle plate 71 at each of the outlets 69, 70 of the gas mixer 205. Except the above point, the configuration of the gas mixer 205 is the same as that of the gas mixer 202 of the second embodiment.

In the gas mixer 205 of the third embodiment, the outlet 69 for the fluid such as the mixed gas guided by the inner passage forming members 62c and 62d is partially closed by the baffle plate 71 as shown in FIG. 14(b), so that the opening area of the outlet 69 is substantially halved. By substantially halving the opening area of the outlet 69 and other corresponding outlets, the flow velocity of the fluid discharged from the gas mixer 205 can be increased. With this arrangement, the flow velocities of the fluid flowing inside the mixing concentric cylinder 61 and the fluid flowing outside it can be increased, so that the mixed condition of the fluid such as the mixed gas can be further improved.

Although the third embodiment has been discussed in terms of the baffle plates 71 having a size large enough to cover about half of the area of each outlet 69, the size of the baffle plates 71 is not necessarily limited to this but may be arbitrarily determined according to the mixed condition required for the mixed gas etc.

Fourth Embodiment

The fourth embodiment of the invention differs from the configuration of the hydrogen generator 200 of the second embodiment only in the internal configuration of the gas mixer. Therefore, only the internal configuration of the gas mixer will be described in the fourth embodiment, similarly to the case of the third embodiment.

Figure 15A:
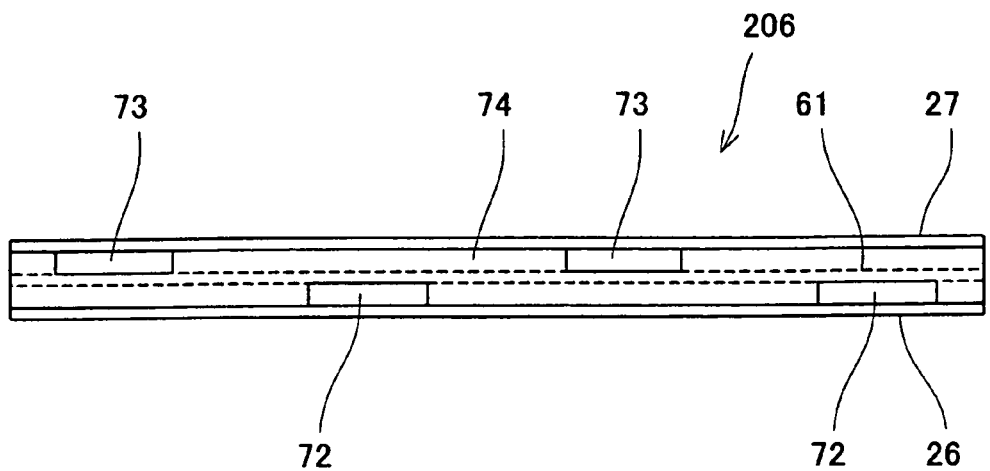
FIG. 15 is structural diagrams each diagrammatically showing an internal configuration of a gas mixer according to a fourth embodiment of the invention, wherein FIGS. 15(*a*), 15(*b*) are a top view and side view, respectively, of the gas mixer.
Figure 15B:
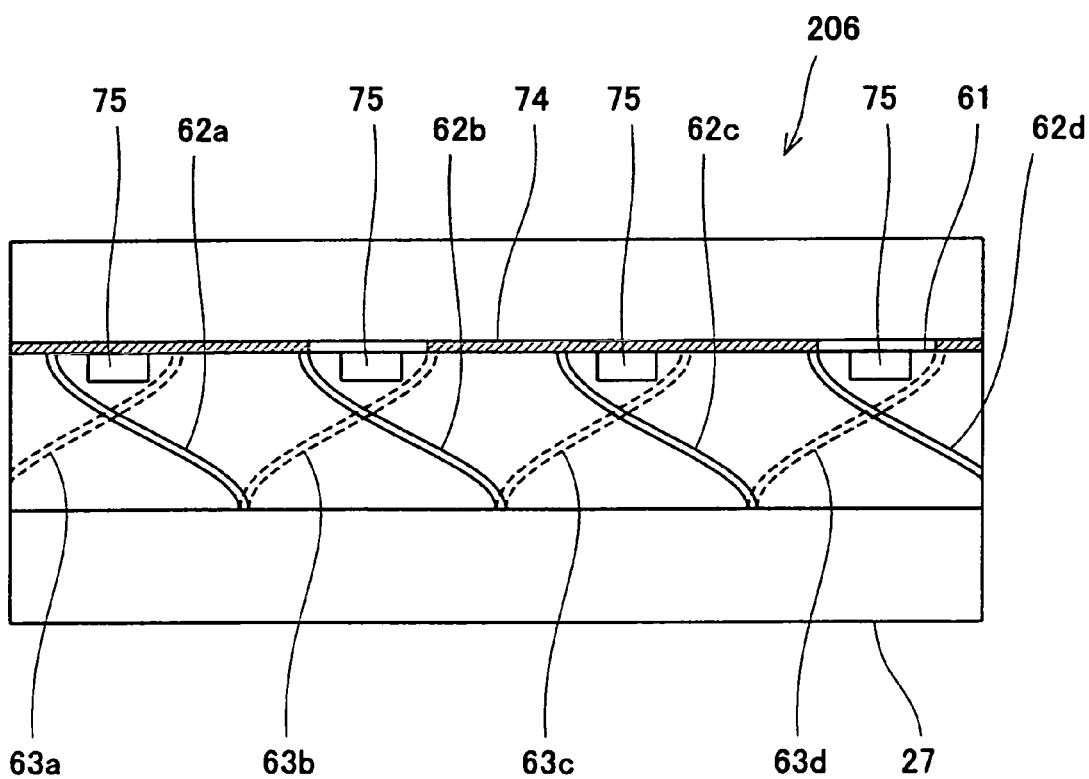

FIG. 15 is structural diagrams each diagrammatically showing the internal configuration of a gas mixer 206 according to the fourth embodiment of the invention, wherein FIGS. 15(a), 15(b) are a top view and side view, respectively, of the gas mixer 206. Like the case of the third embodiment, FIGS. 15(a), 15(b) diagrammatically show a ring-shaped gas mixer when transformed into a flat form for descriptive purposes. In FIG. 15(a), the visible parts of the concentric cylinders 26, 27 and the mixing concentric cylinder 61 are indicated by solid line whereas the invisible parts of them by broken line. In FIG. 15(b), the inner passage forming members 62a to 62d located on the side of a person viewing the drawing are indicated by solid line, whereas the outer passage forming members 63a to 63d located on the side opposite to the above side are indicated by broken line. In FIG. 15, the parts thereof corresponding to those of the gas mixer 202 shown in FIG. 8 are identified with the same reference numerals as of FIG. 8.

Basically, the gas mixer 206 of the fourth embodiment has the same internal configuration as that of the gas mixer 205 of the third embodiment. That is, the gas mixer 206 of the fourth embodiment has, on the sides of the mixing concentric cylinder 61, four inner passage forming members 62a to 62d and four outer passage forming members 63a to 63d as shown in FIGS. 15(a) and 15(b).

The gas mixer 206 of the fourth embodiment, however, differs from the gas mixer 205 of the third embodiment in the following two points. First, the outlets for the fluid such as the mixed gas or reformed gas in the gas mixer 206 are provided with a baffle plate 74 having series of openings 72 and 73 as shown in FIGS. 15(a) and 15(b). These openings 72 and 73 open only to the passages at the inner side (i.e., the side where the inner passage forming members 62a to 62d are disposed) of the mixing concentric cylinder 61 and to the passages at the outer side (i.e., the side where the outer passage forming members 63a to 63d are disposed) of the mixing concentric cylinder 61, respectively. Second, openings 75 are provided at specified positions in the neighborhood of the aforesaid outlets of the mixing concentric cylinder 61. As illustrated in FIG. 15(a), the series of openings 72 and 73 of the baffle plate 74 are provided on the side of the concentric cylinder 26 and on the side of the concentric cylinder 27, respectively, such that the openings 72, 73 are aligned in a zigzag manner in a longitudinal direction of the baffle plate 74. The area of each of the openings 72, 73 is approximately half the opening area of the outlet of each passage defined by, for example, the inner passage forming member 62a and 62b, similarly to the case of the third embodiment. In addition, the openings 75 in the shape of rectangle are formed at the end (this end is on the same side as the above outlets) of the mixing concentric cylinder 61, being located at the positions corresponding to the openings 72, 73, as shown in FIG. 15(b). More specifically, the distinctive feature of the gas mixer 206 of the fourth embodiment resides in that the baffle plate 74 having the openings 72, 73 is provided at the aforesaid outlet part of the gas mixer 206 and the mixing concentric cylinder 61 is also provided with the openings 75. Except these points, the gas mixer 206 is the same as the gas mixer 205 of the third embodiment in configuration.

In the gas mixer 206 of this embodiment, the fluid which has passed through the passage defined by, for instance, the inner passage forming members 62a and 62b is discharged only from the opening 75. At that time, this fluid is mixed with the fluid which has passed through the passage defined by the outer passage forming members 63d and 63a and then discharged outwardly from the gas mixer 206 through the opening 73. According to the gas mixer 206 of the fourth embodiment, the fluids which have passed through the inner and outer sides of the mixing concentric cylinder 61 are forcibly mixed with each other when passing through the openings 72, 73 and the openings 75, so that the mixed condition of the fluid such as the mixed gas can be further improved.

Although the fourth embodiment has been discussed in the context of the openings 72, 73 having area that is approximately half the opening area of the outlet of each passage defined by e.g., the inner passage forming members 62b and 62c, the invention is not necessarily limited to this but equally applicable to cases where the opening area of the openings 72, 73 can be arbitrarily determined in accordance with the mixed condition required for the fluid such as the mixed gas. In addition, the opening area and shape of the openings 75 may be arbitrarily determined in accordance with the mixed condition required for the fluid such as the mixed gas.

Incidentally, since the gas mixers 201, 202 to 206 described in the second to fourth embodiments are very compact in size, they can be accommodated within the hydrogen generator 200 even if a plurality of aforesaid gas mixers are serially aligned, forming an assemblage of gas mixers. In this case, the gas mixers are arranged in series, so that the mixed condition of the fluids such as the mixed gas can be further improved.

Figure 16:
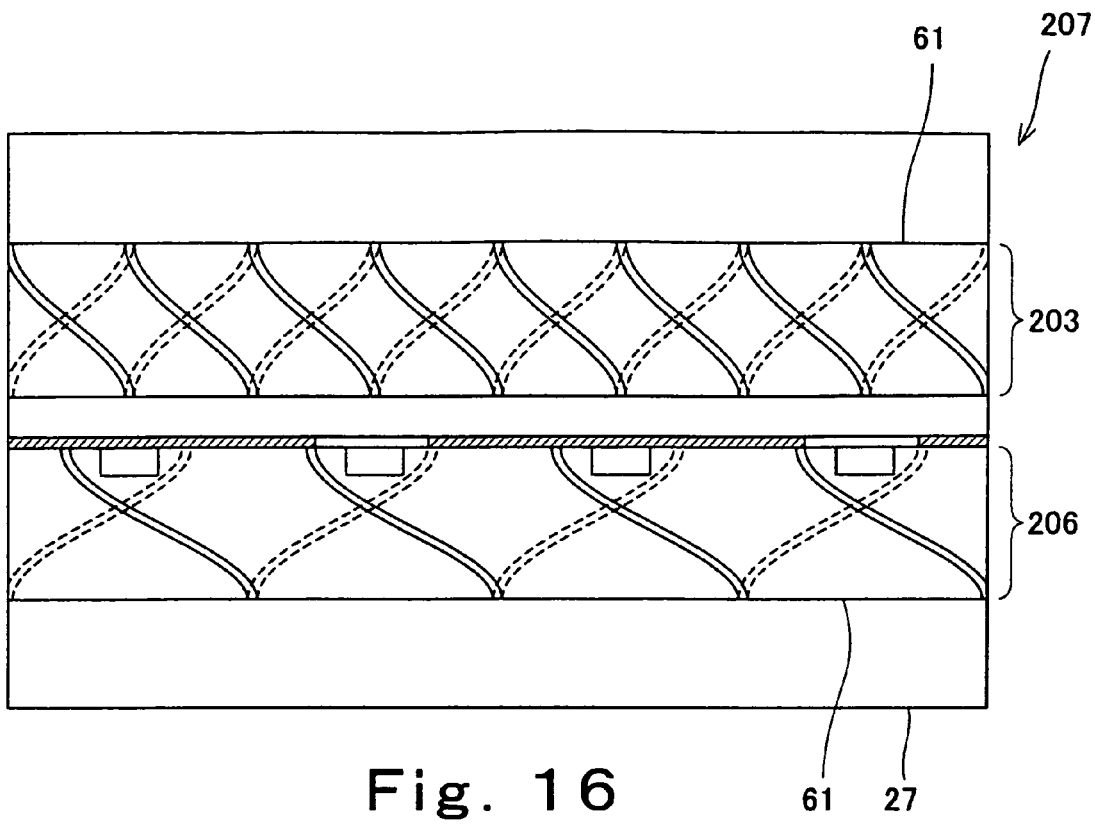
FIG. 16 is a structural diagram diagrammatically showing an internal configuration of a first gas mixer assemblage in which the gas mixers according to the second to fourth embodiments of the invention are serially arranged.

FIG. 16 is a structural diagram diagrammatically showing an internal configuration of a first gas mixer assemblage 207 in which the gas mixer 203 of the second embodiment and the gas mixer 206 of the fourth embodiments are serially arranged. FIG. 16 diagrammatically shows the first ring-shaped gas mixer assemblage when transformed into a flat form for descriptive purposes, similarly to the case of the third embodiment.

In the first gas mixer 207 shown in FIG. 16, the gas mixer 206 according to the fourth embodiment is disposed on the upstream side with respect to the fluid (e.g., the mixed gas), whereas the gas mixer 203 shown in FIG. 11 is disposed on the downstream side. The configurations and others of the gas mixers 203 and 206 are as described in the second and fourth embodiments. The serial arrangement of the plurality of gas mixers 203, 206 makes it possible to further improve the mixed condition of the fluid (e.g., the mixed gas) because the mixing abilities possessed by all the gas mixers 203, 206 are combined together.

Figure 17:
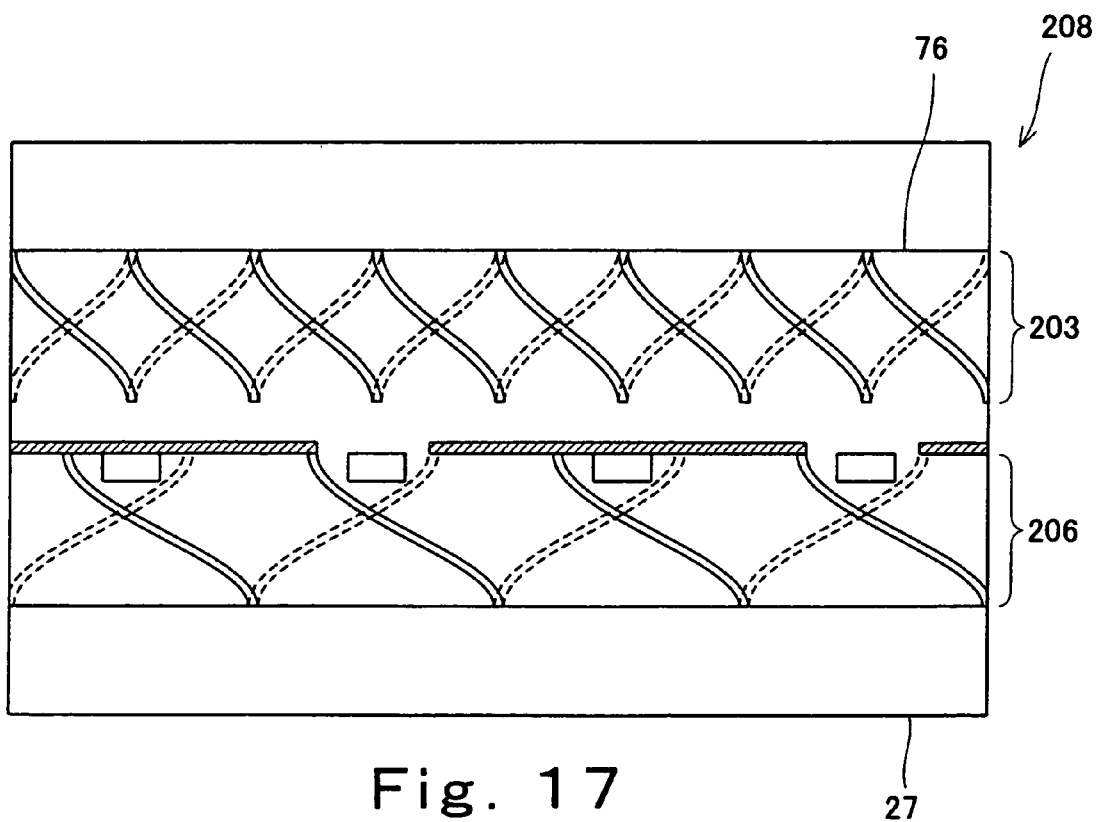
FIG. 17 is a structural diagram diagrammatically showing an internal configuration of a second gas mixer assemblage in which the gas mixers according to the second to fourth embodiments of the invention are serially arranged.
Figure 18:
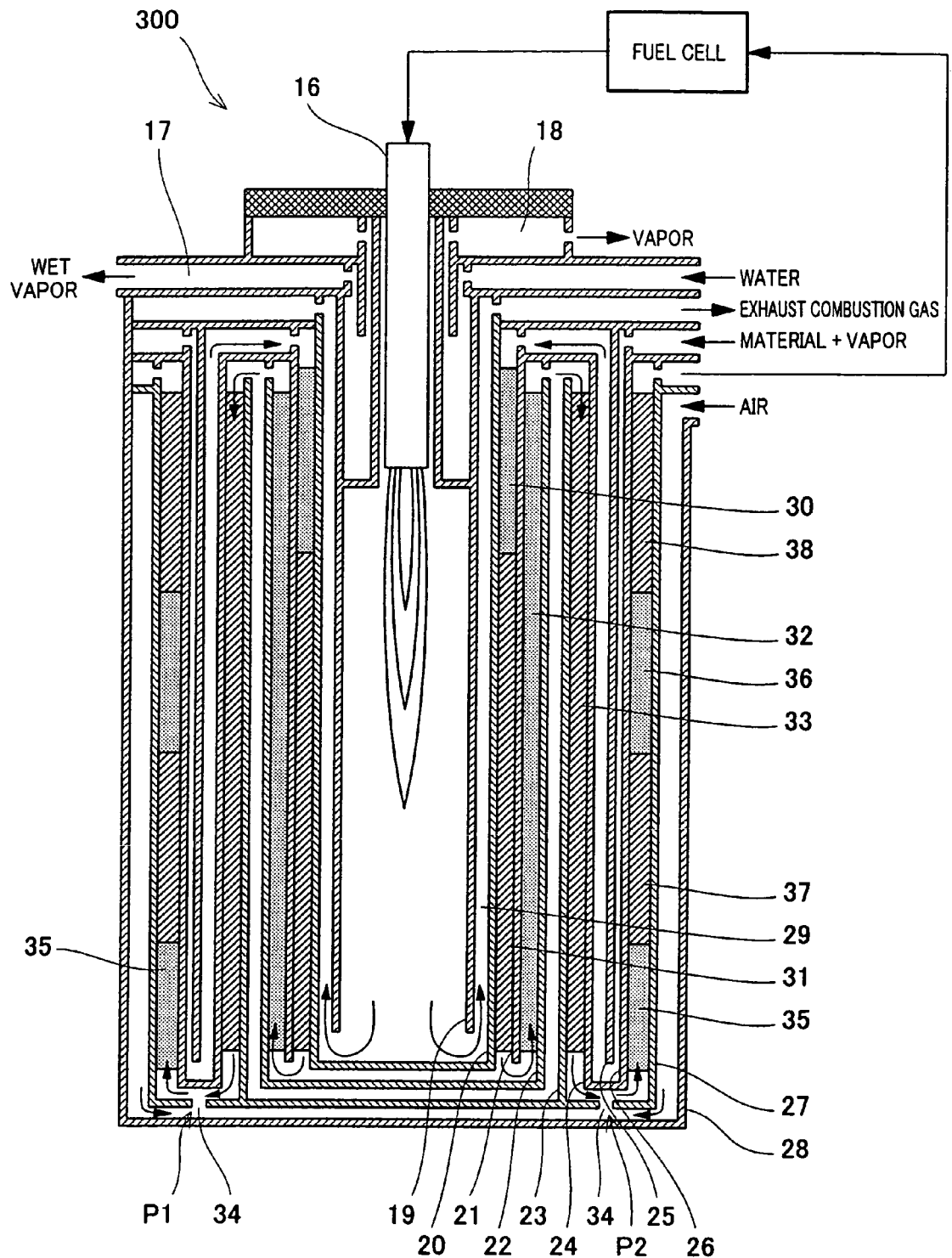
FIG. 18 is a longitudinal sectional view diagrammatically showing an internal configuration of one example of hydrogen generators capable of uniformly mixing a material and vapor.
Figure 19:
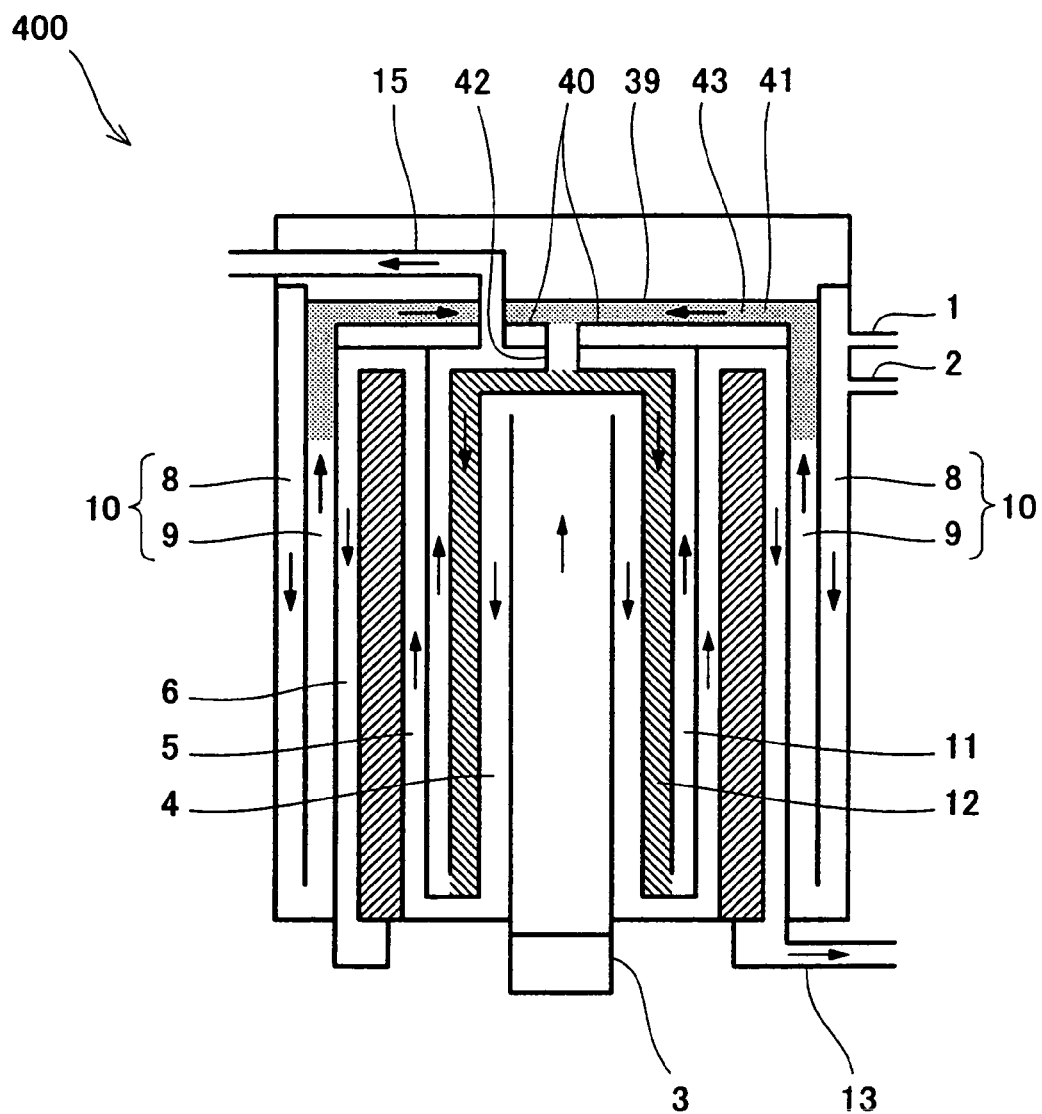
FIG. 19 is a longitudinal sectional view diagrammatically showing an internal configuration of one example of hydrogen generators having improved mixing performance to fluids existing in positions circumferentially distant from each other.

FIG. 17 is a structural diagram diagrammatically showing the internal configuration of a second gas mixer assemblage 208 in which the gas mixer 203 of the second embodiment and the gas mixer 206 of the fourth embodiments are serially arranged.

The second gas mixer assemblage 208 shown in FIG. 17 differs from the first gas mixer assemblage 207 described earlier. Specifically, whereas the first gas mixer assemblage 207 described earlier is configured such that the mixing concentric cylinder 61 of the gas mixer 203 and the mixing concentric cylinder 61 of the gas mixer 206 are independently formed, the second gas mixer assemblage 208 is configured such that the gas mixer 203 and the gas mixer 206 share a single mixing concentric cylinder 76. This makes the second gas mixer assemblage 208 simpler in configuration than the first gas mixer assemblage 207.

According to the first to fourth embodiments of the invention, since the overall gas mixer can be made of a thin plate such as stainless steel sheets, it becomes possible to make the weight of the gas mixer be, e.g., 300 g or less and the heat capacity of it be, e.g., about 0.5 kJ/kg·° C. Therefore, the amount of heat required for heating the gas mixer can be made to be e.g., about 26 kJ, so that the delay in starting up the hydrogen generator can be shortened to, e.g., 1/5 or less. In addition, since the amount of heat required for heating the gas mixer can be made to be about 26 kJ, the electric energy required for operating the fuel cell system can be saved.

According to the first to fourth embodiments, since the heat capacity of the gas mixer can be reduced to one fifth or less the heat capacity of the gas mixer filled with ceramics balls or the like, steam condensation caused by cooling at the surface of the gas mixer can be effectively prevented. This makes it possible to effectively prevent a drop in the S/C ratio when starting up the hydrogen generator. In addition, the catalytic performance of the reforming catalyst can be stably maintained for long periods of time.

According to the first to fourth embodiments, since the mixed condition of fluids (e.g., the mixed gas of city gas and vapor supplied to the reforming catalyst layer; and the reformed gas mixed with air supplied to the selective oxidation catalyst layer) can be dramatically improved by the gas mixer, the generation of the reformed gas in the reforming catalyst layer can be effectively done and the amount of a selective oxidation catalyst to be used can be minimized. As a result, the reforming catalyst layer and the selective oxidation catalyst layer can be reduced in size. Additionally, since wasteful combustion of hydrogen contained in the reformed gas in the selective oxidation catalyst layer can be prevented, it becomes possible to provide a high-efficiency hydrogen generator.

INDUSTRIAL APPLICABILITY

The hydrogen generator according to the invention is useful, because it is equipped with a lightweight, small-heat-capacity, high-performance gas mixer and is therefore good in hydrogen generation efficiency and response.

According to the invention, it is possible to avoid time and spatial non-uniformity in the concentrations of fluids such as a mixed gas of a material and vapor to be supplied to the reforming catalyst layer. As a result, uniform time and spatial uniformity can be ensured for the concentration of the reformed gas, so that it becomes possible to make effective use of the reformed catalyst layer and a carbon monoxide removing catalyst layer such as a shift reactor disposed downstream of the reformed catalyst layer. This highly contributes to reductions in the amounts of the catalysts and in the size of the hydrogen generator.

The invention claimed is:

1. A hydrogen generator comprising:
a mixed gas passage configured to flow a mixed gas containing two or more components;
first and second passages configured to branch off, at their leading ends, from the mixed gas passage and join to each other at their trailing ends;
first turning means formed in the first passage to turn the mixed gas flowing in the first passage in a first direction;
second turning means formed in the second passage to turn the mixed gas flowing in the second passage in a second direction opposite to the first direction; and
a hydrogen generating section configured to generate hydrogen by causing a chemical reaction of the mixed gas which flows out from the joined trailing ends of the first and second passages.

2. The hydrogen generator according to claim 1, wherein the first and second passages are formed so as to allow the mixed gas to turn in the first and second directions respectively, when flowing in planes perpendicular to the outflow direction of the mixed gas flowing out from the trailing ends of the first and second passages.

3. The hydrogen generator according to claim 2, wherein the first and second passages have a common central axis and are hollow in shape, each having an open outer periphery and a circular opening at the center thereof, said outer periphery of each passage constituting an inlet that serves as the leading end while said opening of each passage constitutes an outlet that serves as the trailing end;
wherein the first turning means is composed of a plurality of partition walls that partition the inner space of the first passage in a direction along the central axis and each partition wall extends inwardly from the outer periphery of the inner space such that its trailing end is deviated from its leading end in said first direction with respect to a radial direction; and
wherein the second turning means is composed of a plurality of partition walls that partition the inner space of the second passage in a direction along the central axis and each partition wall extends inwardly from the outer periphery of the inner space such that its trailing end is deviated from its leading end in said second direction with respect to a radial direction.

4. The hydrogen generator according to claim 3, wherein the angle of deviation of the trailing end from the leading end around the central axis in each partition wall is within the range of 45 to 90 degrees.

5. The hydrogen generator according to claim 2, wherein a plurality of said first and second passages and a plurality of said first and second turning means are arranged along the central axis.

6. The hydrogen generator according to claim 1, wherein the first and second passages are formed so as to allow the mixed gas to turn in the first and second directions respectively, when flowing in cylindrical planes parallel to the outflow direction of the mixed gas flowing out from the trailing ends of the first and second passages.

7. The hydrogen generator according to claim 6, wherein the first and second passages have a common central axis and are respectively formed in the shape of a tube of annular section, and one end face of each passage constituting an inlet that serves as the leading end while the other end face of each passage constitutes an outlet that serves as the trailing end;
wherein the first turning means is composed of a plurality of partition walls that turn in the first direction, helically partitioning the tubular inner space of the first passage; and
wherein the second turning means is composed of a plurality of partition walls that turn in the second direction, helically partitioning the tubular inner space of the second passage.

8. The hydrogen generator according to claim 7, wherein the turning angle of each of the partition walls from its leading end to its trailing end is within the range of 45 to 90 degrees.

9. The hydrogen generator according to claim 8, wherein the outlets of turning passages separated by the partition walls are partially closed.

10. The hydrogen generator according to claim 9, wherein the first passage and the second passage are separated from each other by a cylindrical dividing wall, the outlets of the turning passages of either the first or second passage are closed, and an opening is formed in the dividing wall at a position in the vicinity of each of the closed outlets.

11. The hydrogen generator according to claim 6, wherein a plurality of said first passages are arranged along the central axis such that the trailing end of a first passage located in an upstream position when viewed in the flowing direction of the mixed gas is connected to the leading end of a first passage located in a downstream position and a plurality of said second passages are arranged along the central axis such that the trailing end of a second passage located in an upstream position when viewed in the flowing direction of the mixed gas is connected to the leading end of a second passage located in a downstream position.

12. The hydrogen generator according to claim 1, wherein the mixed gas is a mixture of water and an organic compound containing at least carbon and hydrogen; the chemical reaction is a steam reforming reaction in which hydrogen is generated from the mixed gas of the organic compound and water; the hydrogen generating section is a reforming reactor section for generating a hydrogen-rich reformed gas through the steam reforming reaction;

wherein the first turning means and second turning means are located at positions upstream of the reforming reactor section; and wherein the mixed gas flowing out from the joined trailing ends of the first and second passages is supplied to the reforming reactor section to generate hydrogen.

13. The hydrogen generator according to claim 1, wherein the mixed gas is a mixture of the reformed gas and oxygen, and a selective oxidation reactor section is used in place of the hydrogen generating section, the selective oxidation reactor section reducing carbon monoxide contained in the reformed gas through a selective oxidation reaction in which carbon monoxide is converted into carbon dioxide;

wherein the first turning means and second turning means are located at positions upstream of the selective oxidation reactor section; and wherein the mixed gas flowing out from the joined trailing ends of the first and second passages is supplied to the selective oxidation reactor section to reduce carbon monoxide contained in the reformed gas.

* * * * *